United States Patent [19]
Garrett

[11] Patent Number: 5,245,328
[45] Date of Patent: * Sep. 14, 1993

[54] METHOD AND APPARATUS FOR DISPLAYING DIFFERENT SHADES OF GRAY ON A LIQUID CRYSTAL DISPLAY

[75] Inventor: James H. Garrett, Spring, Tex.

[73] Assignee: Compaq Computer Corporation, Houston, Tex.

[*] Notice: The portion of the term of this patent subsequent to Nov. 26, 2008 has been disclaimed.

[21] Appl. No.: 597,814

[22] Filed: Oct. 15, 1990

Related U.S. Application Data

[63] Continuation-in-part of Ser. No. 258,269, Oct. 14, 1988, Pat. No. 5,068,649.

[51] Int. Cl.$^5$ ............................................. G09G 3/00
[52] U.S. Cl. ........................................ 345/149; 345/99; 345/89
[58] Field of Search ............... 340/793, 784, 767, 703, 340/811, 794; 358/241, 236

[56] References Cited

U.S. PATENT DOCUMENTS

| 4,531,160 | 7/1985 | Ehn ..................................... 340/793 |
| 4,808,991 | 2/1989 | Tachiuchi et al. .................. 340/793 |
| 4,827,255 | 5/1989 | Ishii .................................... 340/793 |

FOREIGN PATENT DOCUMENTS 0193728 9/1986 European Pat. Off. .

Primary Examiner—Alvin E. Oberley
Assistant Examiner—Xiao M. Wu
Attorney, Agent, or Firm—Brumbaugh, Graves, Donohue & Raymond

[57] ABSTRACT

A method and apparatus are disclosed which provide a means for both spatially and temporarily resolving the on/off states of a two-state display device such as a liquid crystal display to provide apparent shades of gray. A particular feature of this method is that the cycling between on and off states is not performed in a single, repetitive pattern. Rather, a pattern is utilized which repeats only after many cycles. Additionally, when the 10 method disclosed herein is utilized, adjacent pixels, when selected to display the same shade of gray, do not cycle on and off in synchronization, but rather utilize out-of-phase cycling patterns. This spatial resolution reduces perceived flicker in the display and provides a more stable image. In one embodiment, sixteen shades of gray are provided. The shades are generated by cycling individual pixels such that when averaged over time, the duty cycles of such cycling are 0, 1/9, 1/7, 1/5, 2/7, 1/3, 2/5, 7/15, 8/15, 3/5, 2/3, 5/7, 4/5, 6/7, 8/9 and 1.

15 Claims, 22 Drawing Sheets

```
                        6 6 6
                        3 3 3
          0 1 2 3 4 . . . . . . . 7 8 9

⎧ LINE 0 * * * * * · · · · · · * * *
    ⎪      1 * * * * * · · · · · · * * *
    ⎪      2 * * * * * · · · · · · * * *
PANEL 1 ⎨            ·
    ⎪            ·
    ⎪            ·
    ⎩    239 * * * * * · · · · · · * * *
    ⎧    240 * * * * * · · · · · · * * *
    ⎪            ·
PANEL 2 ⎨            ·
    ⎪            ·
    ⎪    478 * * * * * · · · · · · * * *
    ⎩    479 * * * * * · · · · · · * * *
```

FIG. 1

```
              PIXELS
              0 1 2 3 4 5 6 7 · · · · · 639
      LINE 0 | 1 1 0 1 1 · · · · · · · · · · ·
      LINE 1 | 1 1 0 1 1 · · · · · · · · · · ·
```

FIG. 2

TIMEFRAME 1:

```
              PIXELS
              0 1 2 3 4 · · · · · · · · · 639
      LINE 0 | 1 1 0 1 1 · · · · · · · · · · ·
```

TIMEFRAME 2:

```
              PIXELS
              0 1 2 3 4 · · · · · · · · · 639
      LINE 0 | 1 1 0 1 1 · · · · · · · · · · ·
```

FIG. 3

| SHADE # | FRAMES ON | PERCENT OF TIME ON |
|---|---|---|
| 1 | 0 OF 15 (OFF) | 0% |
| 2 | 1 OF 9 | 11% |
| 3 | 1 OF 7 | 14% |
| 4 | 1 OF 5 | 20% |
| 5 | 2 OF 7 | 29% |
| 6 | 1 OF 3 | 33% |
| 7 | 2 OF 5 | 40% |
| 8 | 7 OF 15 | 47% |
| 9 | 8 OF 15 | 53% |
| 10 | 3 OF 5 | 60% |
| 11 | 2 OF 3 | 67% |
| 12 | 5 OF 7 | 71% |
| 13 | 4 OF 5 | 80% |
| 14 | 6 OF 7 | 86% |
| 15 | 8 OF 9 | 89% |
| 16 | 15 OF 15 (ON) | 100% |

FIG. 4

```
       PIXELS
         0 1 2 3 4 5 6 7 8 . . . . . . . . 636 637 638 639
LINE 0 | 0 0 1 0 0 1 0 0 1 . . . . . REPEAT . . 0   0   0   0
LINE 1 | 0 1 0 0 1 0 0 1 0 . . . . . PATTERN . . 0  1   0   0
LINE 2 | 1 0 0 1 0 0 1 0 0 . . . . . . . . . . . 1   0   0   0
LINE 3 | 0 0 1 0 0 1 0 0 1 . . . . . . . . . . . . . . . . . .
       | . . . . . . . .
       | . . . . . . . .
       | . . . . . . . .
LINE 239| . . . . . . . .
```

FIG. 5

4/5 SEQUENCE

|  | G1 | G2 | G3 | G4 | G5 |
|---|---|---|---|---|---|
| BINARY | 01111011 | 11011110 | 11110111 | 10111101 | 11101111 |
| HEXADECIMAL | 7B | DE | F7 | BD | EF |

3/5 SEQUENCE

|  | G1 | G2 | G3 | G4 | G5 |
|---|---|---|---|---|---|
| BINARY | 01011010 | 11010110 | 10110101 | 10101101 | 01101011 |
| HEXADECIMAL | 5A | D6 | B5 | AD | 6B |

FIG. 6

| POSSIBLE ARRANGEMENTS | 0 | 1 | 2 | 3 | 4 | ... | 78 | 79 |
|---|---|---|---|---|---|---|---|---|
| 1 | G1 | G2 | G3 | G4 | G5 | ... | G4 | G5 |
| 2 | G2 | G3 | G4 | G5 | G1 | ... | G5 | G1 |
| 3 | G3 | G4 | G5 | G1 | G2 | ... | G1 | G2 |
| 4 | G4 | G5 | G1 | G2 | G3 | ... | G2 | G3 |
| 5 | G5 | G1 | G2 | G3 | G4 | ... | G3 | G4 |

FIG. 7

| TIMEFRAME 1 | 0 | 1 | 2 | 3 | 4 | ... | 79 |
|---|---|---|---|---|---|---|---|
| LINE 1 | G1 | G2 | G3 | G4 | G5 | ... | G5 |
| LINE 2 | G2 | G3 | G4 | G5 | G1 | ... | G1 |
| LINE 3 | G3 | G4 | G5 | G1 | G2 | ... | G2 |
| LINE 4 | G4 | G5 | G1 | G2 | G3 | ... | G3 |
| LINE 5 | G5 | G1 | G2 | G3 | G4 | ... | G4 |

| TIMEFRAME 2 | 0 | 1 | 2 | 3 | 4 | ... | 79 |
|---|---|---|---|---|---|---|---|
| LINE 1 | G4 | G5 | G1 | G2 | G3 | ... | G3 |
| LINE 2 | G5 | G1 | G2 | G3 | G4 | ... | G4 |
| LINE 3 | G1 | G2 | G3 | G4 | G5 | ... | G5 |
| LINE 4 | G2 | G3 | G4 | G5 | G1 | ... | G1 |
| LINE 5 | G3 | G4 | G5 | G1 | G2 | ... | G2 |

FIG. 8

4/5 PATTERN—FRAME 1

O●●●●O●●●●O●●●●O●●●●O●●●●O●O....
OOOOOOOOOOOOOOOOOOOOO....

\* \* \*

....●O●●●●O●●●●O

---

4/5 PATTERN—FRAME 2

●O●●●●O●●●●O●●●●O●●●●O●●●●O......
OOOOOOOOOOOOOOOOOOOOO....

\* \* \*

....●●O●●●●O●●●●O

---

3/5 PATTERN—FRAME 1

O●O●●O●O●●O●O●●O●O●●O●O●●O●O....
●●O●O●●O●O●●O●O●●O●O●●O●●O....

\* \* \*

....●O●O●●O●O●●O●

---

3/5 PATTERN—FRAME 2

●O●O●●O●O●●O●O●●O●O●●O●O●●O●....
●●O●O●●O●O●●O●O●●O●O●●O●●O....

\* \* \*

....●●O●O●O●O●O●●O

---

2/3 PATTERN—FRAME 1

●O●●O●●O●●O●O●O●●O●●O●●O●●O●●......
O●●O●●O●●O●●O●●O●●O●●O●●O●....

\* \* \*

....●●O●●●O●●O●●O●

---

2/3 PATTERN—FRAME 2

2/3 SEQUENCE
FRAME 1

| CHAR # | 0 | 1 | 2 | . . . . | 79 |
|---|---|---|---|---|---|
| LINE 1 | B6 | DB | 6D | . . . . | DB |
| LINE 2 | 6D | B6 | DB | . . . . | B6 |
| LINE 3 | DB | 6D | B6 | . . . . | 6D |
| . | | | | | |
| LINE 240 | DB | 6D | B6 | . . . . | 6D |

FRAME 2

| CHAR # | 0 | 1 | 2 | . . . . | 79 |
|---|---|---|---|---|---|
| LINE 1 | DB | 6D | B6 | . . . . | 6D |
| LINE 2 | B6 | DB | 6D | . . . . | DB |
| LINE 3 | 6D | B6 | DB | . . . . | B6 |
| . | | | | | |
| LINE 240 | 6D | B6 | DB | . . . . | B6 |

FRAME 3

| CHAR # | 0 | 1 | 2 | . . . . | 79 |
|---|---|---|---|---|---|
| LINE 1 | 6D | B6 | DB | . . . . | B6 |
| LINE 2 | DB | 6D | B6 | . . . . | 6D |
| LINE 3 | B6 | DB | 6D | . . . . | DB |
| . | | | | | |
| LINE 240 | B6 | DB | 6D | . . . . | DB |

FIG. 10

4/5 SEQUENCE
FRAME 1

| CHAR # | 0 | 1 | 2 | 3 | 4 | . . . . 79 |
|---|---|---|---|---|---|---|
| LINE 1 | 7B | DE | F7 | BD | EF | . . . . EF |
| LINE 2 | DE | F7 | BD | EF | 7B | . . . . 7B |
| LINE 3 | FT | BD | EF | 7B | DE | . . . . DE |
| LINE 4 | BD | EF | 7B | DE | F7 | . . . . F7 |
| LINE 5 | EF | 7B | DE | F7 | BD | . . . . BD |
| . . . | | | | | | |
| LINE 240 | EF | 7B | DE | F7 | BD | . . . . BD |

FRAME 2

| LINE 1 | BD | EF | 7B | DE | F7 |
|---|---|---|---|---|---|
| LINE 2 | EF | 7B | DE | F7 | BD |
| LINE 3 | 7B | DE | F7 | BD | EF |
| LINE 4 | DE | F7 | BD | EF | 7B |
| LINE 5 | F7 | BD | EF | 7B | DE |

FRAME 3

| LINE 1 | DE | F7 | BD | EF | 7B |
|---|---|---|---|---|---|
| LINE 2 | F7 | BD | EF | 7B | DE |
| LINE 3 | BD | EF | 7B | DE | F7 |
| LINE 4 | EF | 7B | DE | F7 | BD |
| LINE 5 | 7B | DE | F7 | BD | EF |

FRAME 4

| LINE 1 | EF | 7B | DE | F7 | BD |
|---|---|---|---|---|---|
| LINE 2 | 7B | DE | F7 | BD | EF |
| LINE 3 | DE | F7 | BD | EF | 7B |
| LINE 4 | F7 | BD | EF | 7B | DE |
| LINE 5 | BD | EF | 7B | DE | F7 |

FRAME 5

| LINE 1 | F1 | BD | EF | 7B | DE |
|---|---|---|---|---|---|
| LINE 2 | BD | EF | 7B | DE | F7 |
| LINE 3 | EF | 7B | DE | F7 | BD |
| LINE 4 | 7B | DE | F7 | BD | EF |
| LINE 5 | DE | F7 | BD | EF | 7B |

FIG. 11

3/5 SEQUENCE
FRAME 1

| CHAR # | 0 | 1 | 2 | 3 | 4 | . . . . | 79 |
|---|---|---|---|---|---|---|---|
| LINE 1 | 5A | D6 | B5 | AD | 6B | . . . . | 6B |
| LINE 2 | D6 | B5 | AD | 6B | 5A | . . . . | 5A |
| LINE 3 | B5 | AD | 6B | 5A | D6 | . . . . | D5 |
| LINE 4 | AD | 6B | 5A | D6 | B5 | . . . . | B5 |
| LINE 5 | 6B | 5A | D6 | B5 | AD | . . . . | AD |
| . . . | | | | | | | |
| LINE 240 | 6B | 5A | D5 | B5 | AD | . . . . | AD |

FRAME 2

| LINE 1 | AD | 6B | 5A | D6 | B5 |
|---|---|---|---|---|---|
| LINE 2 | 5B | 5A | D6 | B5 | AD |
| LINE 3 | 5A | D6 | B5 | AD | 6B |
| LINE 4 | D6 | B5 | AD | 6B | 5A |
| LINE 5 | B5 | AD | 6B | 5A | D6 |

FRAME 3

| LINE 1 | D6 | B5 | AD | 6B | 5A |
|---|---|---|---|---|---|
| LINE 2 | B5 | AD | 6B | 5A | D6 |
| LINE 3 | AD | 6B | 5A | D6 | B5 |
| LINE 4 | 6B | 5A | D6 | B5 | AD |
| LINE 5 | 5A | D6 | B5 | AD | 6B |

FRAME 4

| LINE 1 | 6B | 5A | D6 | B5 | AD |
|---|---|---|---|---|---|
| LINE 2 | 5A | D6 | B5 | AD | 6B |
| LINE 3 | D6 | B5 | AD | 6B | 5A |
| LINE 4 | B5 | AD | 6B | 5A | D6 |
| LINE 5 | AD | 6B | 5A | D6 | B5 |

FRAME 5

| LINE 1 | B5 | AD | 6B | 5A | D6 |
|---|---|---|---|---|---|
| LINE 2 | AD | 6B | 5A | D6 | B5 |
| LINE 3 | 6B | 5A | D6 | B5 | AD |
| LINE 4 | 5A | D6 | B5 | AD | 6B |
| LINE 5 | D6 | B5 | AD | 6B | 5A |

FIG. 12

5/7 SEQUENCE
FRAME 1

| CHAR # | 0 | 1 | 2 | 3 | 4 | 5 | 6 | ... | 79 |
|---|---|---|---|---|---|---|---|---|---|
| LINE 1 | F9 | F3 | E7 | CF | 9F | 3E | 7C | ... | E7 |
| LINE 2 | CF | 9F | 3E | 7C | F9 | F3 | E7 | ... | 3E |
| LINE 3 | 7C | F9 | F3 | E7 | CF | 9F | 3E | ... | F3 |
| LINE 4 | E7 | CF | 9F | 3E | 7C | F9 | F3 | ... | 9F |
| LINE 5 | 3E | 7C | F9 | E3 | E7 | CF | 9F | ... | F9 |
| LINE 6 | F3 | E7 | CF | 9F | 3E | 7C | E9 | ... | CF |
| LINE 7 | 9F | 3E | 7C | F9 | F3 | E7 | CF | ... | 7C |
| ... | | | | | | | | | |
| LINE 240 | CF | 9F | 3E | 7C | F9 | F3 | E7 | ... | 3E |

FRAME 2
```
LINE 1:  7C F9 F3 E7 CF 9F 3E
LINE 2:  E7 CF 9F 3E 7C F9 F3
LINE 3:  3E 7C F9 E3 E7 CF 9F
LINE 4:  F3 E7 CF 9F 3E 7C F9
LINE 5:  9F 3E 7C F9 F3 E7 CF
LINE 6:  F9 F3 E7 CF 9F 3E 7C
LINE 7:  CF 9F 3E 7C F9 F3 E7
```

FRAME 3
```
LINE 1:  3E 7C F9 E3 E7 CF 9F
LINE 2:  F3 E7 CF 9F 3E 7C F9
LINE 3:  9F 3E 7C F9 F3 E7 CF
LINE 4:  F9 F3 E7 CF 9F 3E 7C
LINE 5:  CF 9F 3E 7C F9 F3 E7
LINE 6:  7C F9 F3 E7 CF 9F 3E
LINE 7:  E7 CF 9F 3E 7C F9 F3
```

FRAME 4
```
LINE 1:  9F 3E 7C F9 F3 E7 CF
LINE 2:  F9 F3 E7 CF 9F 3E 7C
LINE 3:  CF 9F 3E 7C F9 F3 E7
LINE 4:  7C F9 F3 E7 CF 9F 3E
LINE 5:  E7 CF 9F 3E 7C F9 F3
LINE 6:  3E 7C F9 E3 E7 CF 9F
LINE 7:  F3 E7 CF 9F 3E 7C F9
```

FRAME 5
```
LINE 1:  CF 9F 3E 7C F9 F3 E7
LINE 2:  7C F9 F3 E7 CF 9F 3E
LINE 3:  E7 CF 9F 3E 7C F9 F3
LINE 4:  3E 7C F9 E3 E7 CF 9F
LINE 5:  F3 E7 CF 9F 3E 7C F9
LINE 6:  9F 3E 7C F9 F3 E7 C7
LINE 7:  F9 F3 E7 CF 9F 3E 7C
```

FRAME 6
```
LINE 1:  E7 CF 9F 3E 7C F9 F3
LINE 2:  3E 7C F9 E3 E7 CF 9F
LINE 3:  F3 E7 CF 9F 3E 7C F9
LINE 4:  9F 3E 7C F9 F3 E7 CF
LINE 5:  F9 F3 E7 CF 9F 3E 7C
LINE 6:  CF 9F 3E 7C F9 F3 E7
LINE 7:  7C F9 F3 E7 CF 9F 3E
```

FRAME 7
```
LINE 1:  F3 E7 CF 9F 3E 7C F9
LINE 2:  9F 3E 7C F9 F3 E7 CF
LINE 3:  F9 F3 E7 CF 9F 3E 7C
LINE 4:  CF 9F 3E 7C F9 F3 E7
LINE 5:  7C F9 F3 E7 CF 9F 3E
LINE 6:  E7 CF 9F 3E 7C F9 F3
LINE 7:  3E 7C F9 E3 E7 CF 9F
```

FIG. 13

6/7 SEQUENCE
FRAME 1

| CHAR # | 0 | 1 | 2 | 3 | 4 | 5 | 6 | . . . . | 79 |
|---|---|---|---|---|---|---|---|---|---|
| LINE 1 | 7E | FD | FB | F7 | EF | DF | BF | . . . . | FB |
| LINE 2 | F7 | EF | DF | BF | 7E | FD | FB | . . . . | DF |
| LINE 3 | BF | 7E | FD | FB | F7 | EF | DF | . . . . | FD |
| LINE 4 | FB | F7 | EF | DF | BF | 7E | FD | . . . . | EF |
| LINE 5 | DF | BF | 7E | FD | FB | F7 | EF | . . . . | 7E |
| LINE 6 | FD | FB | F7 | EF | DF | BF | 7E | . . . . | F7 |
| LINE 7 | EF | DF | BF | 7E | FD | FB | E7 | . . . . | BF |
| LINE 240 | F7 | EF | DF | BF | 7E | FD | FB | . . . . | DF |

FRAME 2
```
LINE 1:  BF 7E FD FB F7 EF DF
LINE 2:  FB F7 EF DF BF 7E FD
LINE 3:  DF BF 7E FD FB F7 EF
LINE 4:  FD FB F7 EF DF BF 7E
LINE 5:  EF DF BF 7E FD FB F7
LINE 6:  7E FD FB F7 EF DF BF
LINE 7:  F7 EF DF BF 7E FD FB
```

FRAME 3
```
LINE 1:  DF BF 7E FD FB F7 EF
LINE 2:  FD FB F7 EF DF BF 7E
LINE 3:  EF DF BF 7E FD FB F7
LINE 4:  7E FD FB F7 EF DF BF
LINE 5:  F7 EF DF BF 7E FD FB
LINE 6:  BF 7E FD FB F7 EF DF
LINE 7:  FB F7 EF DF BF 7E FD
```

FRAME 4
```
LINE 1:  EF DF BF 7E FD FB F7
LINE 2:  7E FD FB F7 EF DF BF
LINE 3:  F7 EF DF BF 7E FD FB
LINE 4:  BF 7E FD FB F7 EF DF
LINE 5:  FB F7 EF DF BF 7E FD
LINE 6:  DF BF 7E FD FB F7 EF
LINE 7:  FD FB F7 EF DF BF 7E
```

FRAME 5
```
LINE 1:  F7 EF DF BF 7E FD FB
LINE 2:  BF 7E FD FB F7 EF DF
LINE 3:  FB F7 EF DF BF 7E FD
LINE 4:  DF BF 7E FD FB F7 EF
LINE 5:  FD FB F7 EF DF BF 7E
LINE 6:  EF DF BF 7E FD FB F7
LINE 7:  7E FD FB F7 EF DF BF
```

FRAME 6
```
LINE 1:  FB F7 EF DF BF 7E FD
LINE 2:  DF BF 7E FD FB F7 EF
LINE 3:  FD FB F7 EF DF BF 7E
LINE 4:  EF DF BF 7E FD FB F7
LINE 5:  7E FD FB F7 EF DF BF
LINE 6:  F7 EF DF BF 7E FD FB
LINE 7:  BF 7E FD FB F7 EF DF
```

FRAME 7
```
LINE 1:  FD FB F7 EF DF BF 7E
LINE 2:  EF DF BF 7E FD FB F7
LINE 3:  7E FD FB F7 EF DF BF
LINE 4:  F7 EF DF BF 7E FD FB
LINE 5:  BF 7E FD FB F7 EF DF
LINE 6:  FB F7 EF DF BF 7E FD
LINE 7:  DF BF 7E FD FB F7 EF
```

FIG. 14

8/9 SEQUENCE
FRAME 1

| CHAR # | 0 | 1 | 2 | 3 | 4 | 5 | 6 | 7 | 8 | • | • | • | • | 79 |
|---|---|---|---|---|---|---|---|---|---|---|---|---|---|---|
| LINE 1 | 00 | FF | FF | FF | FF | FF | FF | FF | FF | • | • | • | • | FF |
| LINE 2 | FF | 00 | FF | FF | FF | FF | FF | FF | FF | • | • | • | • | FF |
| LINE 3 | FF | FF | 00 | FF | FF | FF | FF | FF | FF | • | • | • | • | FF |
| LINE 4 | FF | FF | FF | 00 | FF | FF | FF | FF | FF | • | • | • | • | FF |
| LINE 5 | FF | FF | FF | FF | 00 | FF | FF | FF | FF | • | • | • | • | FF |
| LINE 6 | FF | FF | FF | FF | FF | 00 | FF | FF | FF | • | • | • | • | FF |
| LINE 7 | FF | FF | FF | FF | FF | FF | 00 | FF | FF | • | • | • | • | FF |
| LINE 8 | FF | FF | FF | FF | FF | FF | FF | 00 | FF | • | • | • | • | FF |
| LINE 9 | FF | FF | FF | FF | FF | FF | FF | FF | 00 | • | • | • | • | FF |
| LINE 240 | FF | FF | FF | FF | FF | 00 | FF | FF | FF | • | • | • | • | FF |

FRAME 2

| | | | | | | | | |
|---|---|---|---|---|---|---|---|---|
| LINE 1: | FF | FF | FF | FF | FF | FF | FF | 00 | FF |
| LINE 2: | FF | FF | FF | FF | FF | FF | FF | FF | 00 |
| LINE 3: | 00 | FF | FF | FF | FF | FF | FF | FF | FF |
| LINE 4: | FF | 00 | FF | FF | FF | FF | FF | FF | FF |
| LINE 5: | FF | FF | 00 | FF | FF | FF | FF | FF | FF |
| LINE 6: | FF | FF | FF | 00 | FF | FF | FF | FF | FF |
| LINE 7: | FF | FF | FF | FF | 00 | FF | FF | FF | FF |
| LINE 8: | FF | FF | FF | FF | FF | 00 | FF | FF | FF |
| LINE 9: | FF | FF | FF | FF | FF | FF | 00 | FF | FF |

FRAME 3

| | | | | | | | | |
|---|---|---|---|---|---|---|---|---|
| LINE 1: | FF | FF | FF | FF | FF | 00 | FF | FF | FF |
| LINE 2: | FF | FF | FF | FF | FF | FF | 00 | FF | FF |
| LINE 3: | FF | FF | FF | FF | FF | FF | FF | 00 | FF |
| LINE 4: | FF | FF | FF | FF | FF | FF | FF | FF | 00 |
| LINE 5: | 00 | FF | FF | FF | FF | FF | FF | FF | FF |
| LINE 6: | FF | 00 | FF | FF | FF | FF | FF | FF | FF |
| LINE 7: | FF | FF | 00 | FF | FF | FF | FF | FF | FF |
| LINE 8: | FF | FF | FF | 00 | FF | FF | FF | FF | FF |
| LINE 9: | FF | FF | FF | FF | 00 | FF | FF | FF | FF |

FRAME 4

| | | | | | | | | |
|---|---|---|---|---|---|---|---|---|
| LINE 1: | FF | FF | FF | 00 | FF | FF | FF | FF | FF |
| LINE 2: | FF | FF | FF | FF | 00 | FF | FF | FF | FF |
| LINE 3: | FF | FF | FF | FF | FF | 00 | FF | FF | FF |
| LINE 4: | FF | FF | FF | FF | FF | FF | 00 | FF | FF |
| LINE 5: | FF | FF | FF | FF | FF | FF | FF | 00 | FF |
| LINE 6: | FF | FF | FF | FF | FF | FF | FF | FF | 00 |
| LINE 7: | 00 | FF | FF | FF | FF | FF | FF | FF | FF |
| LINE 8: | FF | 00 | FF | FF | FF | FF | FF | FF | FF |
| LINE 9: | FF | FF | 00 | FF | FF | FF | FF | FF | FF |

FIG. 15A

FRAME 5

```
LINE 1:   FF OO FF FF FF FF FF FF FF
LINE 2:   FF FF OO FF FF FF FF FF FF
LINE 3:   FF FF FF OO FF FF FF FF FF
LINE 4:   FF FF FF FF OO FF FF FF FF
LINE 5:   FF FF FF FF FF OO FF FF FF
LINE 6:   FF FF FF FF FF FF OO FF FF
LINE 7:   FF FF FF FF FF FF FF OO FF
LINE 8:   FF FF FF FF FF FF FF FF OO
LINE 9:   OO FF FF FF FF FF FF FF FF
```

FRAME 6

```
LINE 1:   FF FF FF FF FF FF FF FF OO
LINE 2:   OO FF FF FF FF FF FF FF FF
LINE 3:   FF OO FF FF FF FF FF FF FF
LINE 4:   FF FF OO FF FF FF FF FF FF
LINE 5:   FF FF FF OO FF FF FF FF FF
LINE 6:   FF FF FF FF OO FF FF FF FF
LINE 7:   FF FF FF FF FF OO FF FF FF
LINE 8:   FF FF FF FF FF FF OO FF FF
LINE 9:   FF FF FF FF FF FF FF OO FF
```

FRAME 7

```
LINE 1:   FF FF FF FF FF FF OO FF FF
LINE 2:   FF FF FF FF FF FF FF OO FF
LINE 3:   FF FF FF FF FF FF FF FF OO
LINE 4:   OO FF FF FF FF FF FF FF FF
LINE 5:   FF OO FF FF FF FF FF FF FF
LINE 6:   FF FF OO FF FF FF FF FF FF
LINE 7:   FF FF FF OO FF FF FF FF FF
LINE 8:   FF FF FF FF OO FF FF FF FF
LINE 9:   FF FF FF FF FF OO FF FF FF
```

FRAME 8

```
LINE 1:   FF FF FF FF OO FF FF FF FF
LINE 2:   FF FF FF FF FF OO FF FF FF
LINE 3:   FF FF FF FF FF FF OO FF FF
LINE 4:   FF FF FF FF FF FF FF OO FF
LINE 5:   FF FF FF FF FF FF FF FF OO
LINE 6:   OO FF FF FF FF FF FF FF FF
LINE 7:   FF OO FF FF FF FF FF FF FF
LINE 8:   FF FF OO FF FF FF FF FF FF
LINE 9:   FF FF FF OO FF FF FF FF FF
```

FRAME 9

```
LINE 1:   FF FF OO FF FF FF FF FF FF
LINE 2:   FF FF FF OO FF FF FF FF FF
LINE 3:   FF FF FF FF OO FF FF FF FF
LINE 4:   FF FF FF FF FF OO FF FF FF
LINE 5:   FF FF FF FF FF FF OO FF FF
LINE 6:   FF FF FF FF FF FF FF OO FF
LINE 7:   FF FF FF FF FF FF FF FF OO
LINE 8:   OO FF FF FF FF FF FF FF FF
LINE 9:   FF OO FF FF FF FF FF FF FF
```

FIG. 15B

7/15 SEQUENCE
FRAME 1

| CHAR # | 0 | 1 | 2 | 3 | 4 | 5 | 6 | 7 | 8 | 9 | 10 | 11 | 12 | 13 | 14 | ·· | 79 |
|---|---|---|---|---|---|---|---|---|---|---|---|---|---|---|---|---|---|
| LINE 1: | CC | 33 | CC | 32 | C9 | 26 | 99 | 66 | 99 | 66 | 99 | 64 | 93 | 4C | 33 | ·· | C9 |
| LINE 2: | 26 | 99 | 66 | 99 | 66 | 99 | 64 | 93 | 4C | 33 | CC | 33 | CC | 32 | C9 | ·· | 66 |
| LINE 3: | 99 | 64 | 93 | 4C | 33 | CC | 33 | CC | 32 | C9 | 26 | 99 | 66 | 99 | 66 | ·· | 33 |

·
·
·

LINE 240 99 64 93 4C 33 CC 33 CC 32 C9 26 99 66 99 66 ·· 33

FRAME 2

LINE 1:  33 CC 33 CC 32 C9 26 99 66 99 66 99 64 93 4C
LINE 2:  C9 26 99 66 99 66 99 64 93 4C 33 CC 33 CC 32
LINE 3:  66 99 64 93 4C 33 CC 33 CC 32 C9 26 99 66 99

FRAME 3

LINE 1:  4C 33 CC 33 CC 32 C9 26 99 66 99 66 99 64 93
LINE 2:  32 C9 26 99 66 99 66 99 64 93 4C 33 CC 33 CC
LINE 3:  99 66 99 64 93 4C 33 CC 33 CC 32 C9 26 99 66

FRAME 4

LINE 1:  93 4C 33 CC 33 CC 32 C9 26 99 66 99 66 99 64
LINE 2:  CC 32 C9 26 99 66 99 66 99 64 93 4C 33 CC 33
LINE 3:  66 99 66 99 64 93 4C 33 CC 33 CC 32 C9 26 99

FRAME 5

LINE 1:  64 93 4C 33 CC 33 CC 32 C9 26 99 66 99 66 99
LINE 2:  33 CC 32 C9 26 99 66 99 66 99 64 93 4C 33 CC
LINE 3:  99 66 99 66 99 64 93 4C 33 CC 33 CC 32 C9 26

FRAME 6

LINE 1:  99 64 93 4C 33 CC 33 CC 32 C9 26 99 66 99 66
LINE 2:  CC 33 CC 32 C9 26 99 66 99 66 99 64 93 4C 33
LINE 3:  26 99 66 99 66 99 64 93 4C 33 CC 33 CC 32 C9

FRAME 7

LINE 1:  66 99 64 93 4C 33 CC 33 CC 32 C9 26 99 66 99
LINE 2:  33 CC 33 CC 32 C9 26 99 66 99 66 99 64 93 4C
LINE 3:  C9 26 99 66 99 66 99 64 93 4C 33 CC 33 CC 32

FIG. 16A

FRAME 8
```
LINE 1:   99 66 99 64 93 4C 33 CC 33 CC 32 C9 26 99 66
LINE 2:   4C 33 CC 33 CC 32 C9 26 99 66 99 66 99 64 93
LINE 3:   32 C9 26 99 66 99 66 99 64 93 4C 33 CC 33 CC
```

FRAME 9
```
LINE 1:   66 99 66 99 64 93 4C 33 CC 33 CC 32 C9 26 99
LINE 2:   93 4C 33 CC 33 CC 32 C9 26 99 66 99 66 99 64
LINE 3:   CC 32 C9 26 99 66 99 66 99 64 93 4C 33 CC 33
```

FRAME 10
```
LINE 1:   99 66 99 66 99 64 93 4C 33 CC 33 CC 32 C9 26
LINE 2:   64 93 4C 33 CC 33 CC 32 C9 26 99 66 99 66 99
LINE 3:   33 CC 32 C9 26 99 66 99 66 99 64 93 4C 33 CC
```

FRAME 11
```
LINE 1:   26 99 66 99 66 99 64 93 4C 33 CC 33 CC 32 C9
LINE 2:   99 64 93 4C 33 CC 33 CC 32 C9 26 99 66 99 66
LINE 3:   CC 33 CC 32 C9 26 99 66 99 66 99 64 93 4C 33
```

FRAME 12
```
LINE 1:   C9 26 99 66 99 66 99 64 93 4C 33 CC 33 CC 32
LINE 2:   66 99 64 93 4C 33 CC 33 CC 32 C9 26 99 66 99
LINE 3:   33 CC 33 CC 32 C9 26 99 66 99 66 99 64 93 4C
```

FRAME 13
```
LINE 1:   32 C9 26 99 66 99 66 99 64 93 4C 33 CC 33 CC
LINE 2:   99 66 99 64 93 4C 33 CC 33 CC 32 C9 26 99 66
LINE 3:   4C 33 CC 33 CC 32 C9 26 99 66 99 66 99 64 93
```

FRAME 14
```
LINE 1:   33 CC 32 C9 26 99 66 99 66 99 64 93 4C 33 CC
LINE 2:   99 66 99 66 99 64 93 4C 33 CC 33 CC 32 C9 26
LINE 3:   64 93 4C 33 CC 33 CC 32 C9 26 99 66 99 66 99
```

FIG. 16B

| SHADE # | FRAMES ON (EVEN) | FRAMES ON (ODD) |
|---|---|---|
| 1 | 0/15 (OFF) | 0/15 (OFF) |
| 2 | 1/9 | 0/15 (OFF) |
| 3 | 1/9 | 1/9 |
| 4 | 1/9 | 1/5 |
| 5 | 1/7 | 1/9 |
| 6 | 1/7 | 1/7 |
| 7 | 1/5 | 1/7 |
| 8 | 1/5 | 1/5 |
| 9 | 2/7 | 1/5 |
| 10 | 2/7 | 2/7 |
| 11 | 1/3 | 2/7 |
| 12 | 1/3 | 1/3 |
| 13 | 2/5 | 1/3 |
| 14 | 2/5 | 2/5 |
| 15 | 7/15 | 2/5 |
| 16 | 7/15 | 7/15 |
| 17 | 8/15 | 7/15 |
| 18 | 8/15 | 8/15 |
| 19 | 3/5 | 8/15 |
| 20 | 3/5 | 3/5 |
| 21 | 2/3 | 3/5 |
| 22 | 2/3 | 2/3 |
| 23 | 5/7 | 2/3 |
| 24 | 5/7 | 5/7 |
| 25 | 4/5 | 5/7 |
| 26 | 4/5 | 4/5 |
| 27 | 6/7 | 4/5 |
| 28 | 6/7 | 6/7 |
| 29 | 8/9 | 6/7 |
| 30 | 8/9 | 8/9 |
| 31 | 15/15 (ON) | 8/9 |
| 32 | 15/15 (ON) | 15/15 (ON) |

| EVEN | ODD |
|---|---|
| ODD | EVEN |

FIG. 17

METHOD AND APPARATUS FOR DISPLAYING DIFFERENT SHADES OF GRAY ON A LIQUID CRYSTAL DISPLAY

This is a continuation-in-part application of pending U.S. application Ser. No. 07/258,269, now U.S. Pat. No. 5,068,649, filed on Oct. 14, 1988.

BACKGROUND OF THE INVENTION

This invention relates to electronic display panels. More particularly, it relates to display panels. More particularly, it relates to display panels comprising liquid crystals and similar display systems having picture elements ("pixels") which normally are selectable in only one of two possible states (e.g., "on" or "off").

TYPES OF DISPLAY PANELS

Many different types of display panels or screens are used in electronic equipment. One particularly common type is the cathode ray tube (CRT) used in television receivers and many computer monitors. Other available display systems include those which employ incandescent filaments, light-emitting diodes ("LED's"), liquid crystal displays ("LCD's"), plasma display panels, and electroluminescent panels.

CRT's are available in both monochrome and color versions. Inasmuch as many personal computers are equipped with color monitors, much software written for such computers is designed to make use of the color capabilities of the monitor.

COLOR-TO-GRAY TRANSLATIONS

When such software is used on a system having only a monochrome monitor, it is customary to "translate" the colors into various "shades of gray". This term, however, does not necessarily imply that the display is colored gray. Many computer monitors provide displays in various other monochrome colors, and hence "shades of gray" actually denotes various contrast levels of those colors.

On a CRT display, various shades of gray (or intensity levels) can be generated simply by varying the intensity of the electron beam impinging on the phosphors of the screen. As this may be accomplished in analog fashion, a virtual continuum of shades of gray is available. Similarly, the intensity of an incandescent filament can be varied by changing the current passing through the filament, and drive circuitry which permits the current to be a continuous variable is well known.

In contrast, other display systems employ essentially "two-state" screen dots, i.e., display elements whose intensity at an instant in time cannot normally be continuously varied, but rather are designed to be in one of two possible states e.g., "on" or "off"; "black" or "white", "light" or "dark"; "polarized" or "unpolarized"; etc.

Plainly, such display systems are ideally suited for use with digital computers which operate using the binary number system. A liquid crystal display (LCD) is an example of such a system.

A problem arises in generating shades of gray on such display systems. Because the screen dots of such systems normally lack intermediate intensity states, "translations" of color displays become difficult or impossible, and at least a portion of the information contained in a display intended for a color monitor is lost.

It might seem that one solution to this problem would simply be to rapidly cycle the various screen dots on and off and varying the duty cycle of such cycling to produce what would appear to the human eye as different shades of gray. If the cycling were sufficiently rapid, the alternating character would not be perceived by the human eye. In practice, however, there are at least two problems with this approach.

The first problem is that many two-state display systems, particularly LCDs, cannot be rapidly cycled. this may be due to constraints inherent in the drive circuitry and/or the intrinsic time constant of the display. For example, LCDs function by aligning liquid crystal molecules in response to an applied electric field. This alignment takes a certain amount of time to accomplish, and the unalignment of the molecules when the electrical signal is removed or reversed also requires an appreciable time interval.

The second problem arises when the repeat rate (the rate at which the screen display is refreshed) is relatively low, e.g., approximately 70 Hz for a display having 8 shades of gray and approximately 140 Hz for a display having 16 shades of gray. The problem is that when an attempt is made to assign different shades of gray to adjacent screen dots using a fixed cycling scheme, a perceptible flicker often results. It is contemplated that this flicker is due to beat frequencies between the two "shades".

SUMMARY OF THE INVENTION

The method and apparatus of the present invention provides a means for both spatially and temporarily resolving the on/off states of a two-state display device such as an LCD to provide apparent shades of gray. In one embodiment, sixteen shades of gray are provided. These shades are generated by cycling individual screen dots such that when averaged over time, the dots are on approximately 0% (always off), 11%, 14%, 20%, 29%, 33%, 40%, 47%, 53%, 60%, 67%, 71%, 80%, 86%, 89% or 100% (always on) of the time.

A feature of the invention is the fact that the cycling between on and off states is not performed in a simple repetitive pattern. For example, the shade of gray corresponding to a screen dot being on 40% of the time can be achieved by selecting the screen dot to be on for 2 frames out of every five. However, rather than employing a pattern which simply repeats every five frames (such as 1001010010100101001010010. . . . . ), a more complex pattern having the same average duty cycle pattern is utilized which repeats only after many frames.

An additional feature of the method of the present invention is that adjacent screen dots, when selected to display the same shade of gray, do not cycle on and off in synchronism, but rather utilize out-of-phase cycling patterns. This spatial resolution reduces perceived flicker in the display and provides a more stable image.

BRIEF DESCRIPTION OF THE DRAWINGS

FIG. 1 shows a screen dot array of a display consisting of two LCD panels;

FIG. 2 is an illustrative representation of two consecutive lines of pixels of the display having the same ON-OFF pattern;

FIG. 3 is an illustrative representation of one line of pixels of the display having the same ON-OFF pattern in two consecutive timeframes;

FIG. 4 is a table of exemplary duty cycles using pattern cycles of 3, 5, 7, 9 and 15 for obtaining sixteen shades of gray on an LCD screen in accordance with the invention;

FIG. 5 is an illustrative representation of the ON-OFF pattern of the pixels of one-half (240 lines) of an exemplary LCD screen in which each pixel is driven at a duty cycle of 1/3 in accordance with the invention;

FIG. 6 depicts binary and hexadecimal representations of exemplary sequences, arranged in 8 pixel groups, having a pattern cycle of 5 and respective duty cycles of 4/5 and 3/5 in accordance with the invention;

FIG. 7 shows exemplary arrangements of the exemplary sequences of FIG. 6 applied to consecutive lines of pixels of the LCD screen to achieve line-to-line skewing in accordance with the invention;

FIG. 8 shows exemplary arrangements of the exemplary sequences of FIG. 6 applied to lines of pixels of the LCD display to achieve frame-to-frame skewing in accordance with the invention;

FIG. 9 is a pictorial representation of the pixels of an LCD screen in successive frames when the pixels of the display are driven at duty cycles of 4/5, 3/5 and 2/3, respectively, using exemplary sequences to achieve line-to-line skewing and frame-to-frame skewing in accordance with the invention;

FIG. 10 shows exemplary 2/3 duty cycle sequences for achieving line-to-line and frame-to-frame skewing in accordance with the invention, the sequences being arranged in 8 pixel groups each represented by a respective hexadecimal number;

FIG. 11 shows exemplary 4/5 duty cycle sequences for achieving line-to-line and frame-to-frame skewing in accordance with the invention, the sequences being arranged in 8 pixel groups each represented by a respective hexadecimal number;

FIG. 12 shows exemplary 3/5 duty cycle sequences for achieving line-to-line and frame-to-frame skewing in accordance with the invention, the sequences being arranged in 8 pixel groups each represented by a respective hexadecimal number;

FIG. 13 shows exemplary 5/7 duty cycles sequences for achieving line-to-line and frame-to-frame skewing in accordance with the invention, the sequences being arranged in 8 pixel groups each represented by a respective hexadecimal number;

FIG. 14 shows exemplary 6/7 duty cycles sequences for achieving line-to-line and frame-to-frame skewing in accordance with the invention, the sequences being arranged in 8 pixel groups each represented by a respective hexadecimal number;

FIGS. 15A and 15B show exemplary 8/9 duty cycles sequences for achieving line-to-line and frame-to-frame skewing in accordance with the invention, the sequences being arranged in 8 pixel groups each represented by a respective hexadecimal number;

FIGS. 16A and 16B show exemplary 7/15 duty cycles sequences for achieving line-to-line and frame-to-frame skewing in accordance with the invention, the sequences being arranged in 8 pixel groups each represented by a respective hexadecimal number;

FIG. 17 contains a table of exemplary pairs of duty cycles which when respectively applied to even and odd diagonally adjacent pairs of screen dots in a 4-dot pixel provides thirty-two shades of gray, and a schematic representation of a 4-dot pixel indicating the even and odd diagonally adjacent pairs of dots;

Throughout the figures of the drawing, the same reference numerals and characters are used to denote like elements, components or features of the depicted apparatus and method.

DETAILED DESCRIPTION OF SPECIFIC EMBODIMENTS

Figure 18:
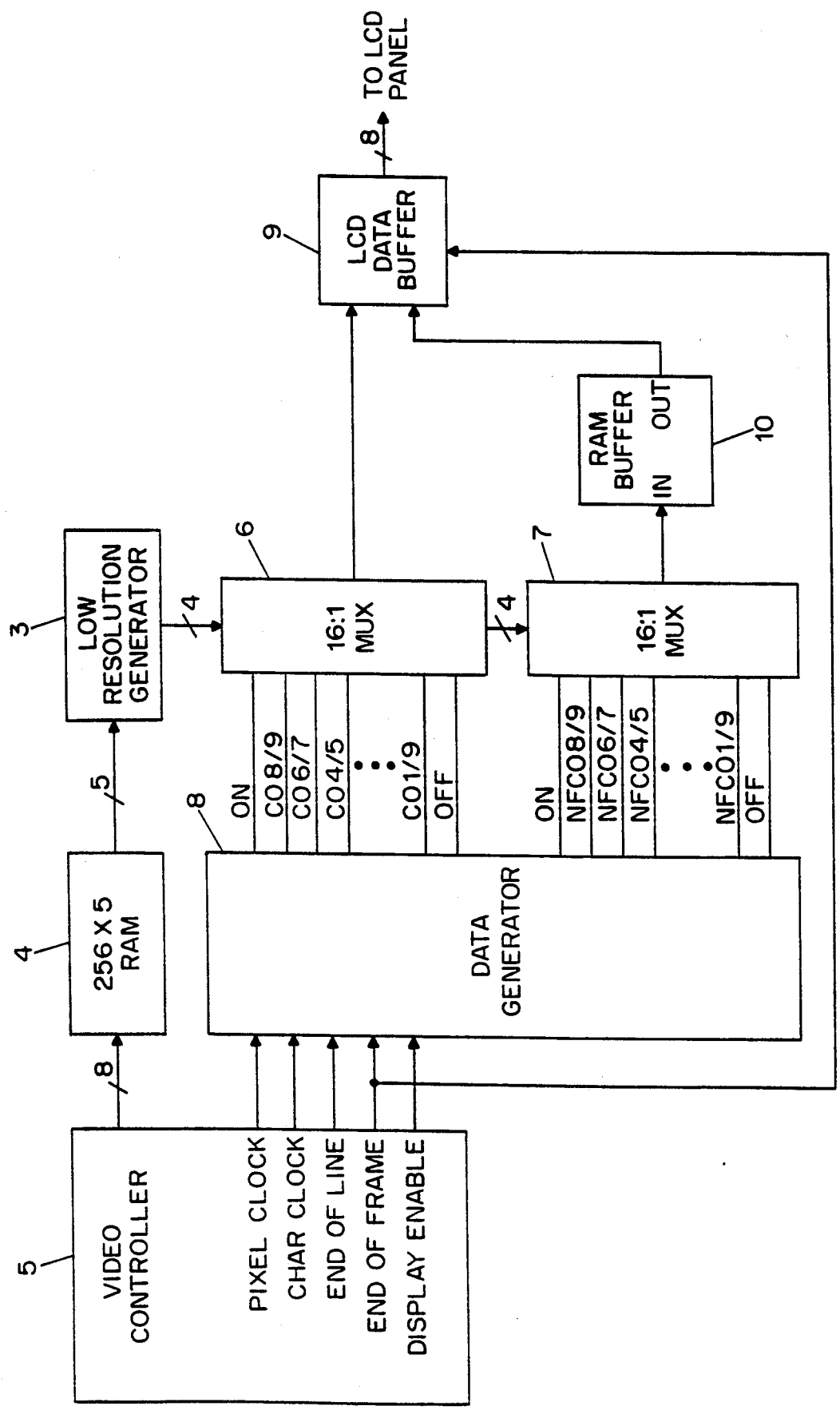
FIG. 18 is a functional block diagram of an exemplary display control system in accordance with an exemplary embodiment of the invention.

FIG. 1 shows a screen dot arrangement of a two panel LCD screen in accordance with the invention. For convenience, the term "pixel" is used synonymously with "screen dot" except where indicated otherwise, for example, in connection with cross-hatching. The pixels are arranged to form a 640-column by 480-row display, which may be formed from two 640×240-pixel LCD panels. The terms "row" and "line" are used interchangeably.

Any given pixel is driven to simulate a shade of gray by driving it toward its ON state for a specified length of time and then driving it toward its OFF state for another specified length of time. For convenience, the basic unit of time is referred to here as a "timeframe", which may be approximately 1/70th of a second for a display capable of 8 shades of gray, or approximately 1/140 of a second for a display capable of 16 shades of gray.

Time-Space Guidelines

Flickering and "swimming" (an apparent instability of the picture on a display, somewhat akin to the visual image of a mirage in a desert) may be reduced in accordance with the invention by driving pixels to conform generally to two basic guidelines: (1) no two consecutive lines of pixels should display the same ON-OFF pattern, and (2) any given line of pixels should not display the same ON-OFF pattern in two consecutive timeframes.

In other words, each pixel's on-off sequence or pattern should be modulated both in a temporal dimension and in a spatial dimension.

These guidelines are illustrated in FIGS. 2 and 3. Assume that a 1 means that the pixel in question is ON and a 0 means the pixel is OFF. The configuration depicted in FIG. 2 does not conform to the first guideline. Likewise, the configuration depicted in FIG. 3 does not conform to the second guideline.

Pattern Cycles and Duty Cycles

Two terms are used herein for convenience. A "pattern cycle" is the repetitive period of a given pixel either in the time dimension (expressed in timeframes) or in a spatial dimension (expressed in pixels). A "duty cycle" is the number of timeframes or pixels within a pattern cycle in which the pixel is ON, divided by the number of timeframes or pixels in the pattern cycle.

In the time dimension, for example, a pixel that is ON for 3 timeframes and then OFF for 2 timeframes, in a repetitive time pattern, has a pattern cycle of 5 and a duty cycle of 3/5. Pixels driven at a 3/5 duty cycle are sometimes referred to herein as 3/5 pixels.

FIG. 4 depicts a table of specific duty cycles for achieving sixteen different shades of gray utilizing five pattern cycles, namely 3, 5, 7, 9 and 15.

Shades with Pattern Cycle of 3

As noted above, to conform to the guidelines discussed above, the ON-OFF sequence or pattern of each pixel should be modulated at selected duty cycles in both time and space. The pattern cycle of 3 is the simplest of the five cases; the set of all possible duty cycles to achieve this modulation in such a pattern cycle are 0/3, 1/3, 2/3, and 3/3.

For the 0/3 and 3/3 duty cycles, the associated pixels are always OFF and always ON, respectively. Consequently, only the other two duty cycles need be examined.

In the spatial dimension, the other two patterns in the pattern cycle of 3 are the permutations of 001 (which is the 1/3 duty cycle) and the permutations of 110 (which is the 2/3 duty cycle).

It will be noted that these two patterns are logical inversions of each other. Therefore, only one of the two need be discussed; the other can be generated by taking the logical inversion of the pattern which is discussed.

The 1/3 duty cycle is discussed here. This duty cycle is implemented as shown in FIG. 5. The basic pattern (001) is repeated throughout an entire line.

A possibility that must be taken into account is that a run of pixels in a certain pattern will transcend a row, i.e., that a particular shade of gray, and its associated pixel pattern, will run past the end of one row into another row. This raises the possibility that two consecutive rows might share the same pixel pattern, and thus would not conform to the above guidelines.

In the example of FIG. 5, such a possibility does not exist since a line in the illustrative display consists of 640 pixels, which is not an integral multiple of 3. Therefore, continuation of the 001 sequence from the end of one line to the beginning of the next will result in the two lines having different spatial pixel patterns. More particularly, a pixel pattern of 001 that begins at pixel 0 of the Nth line will begin to repeat at pixel 639 of that line. However, the repetition of that pattern will continue to pixels 0 and 1 of the next line, i.e., the pixel pattern will "wrap around" the end of the Nth line to the beginning of the next line. Consequently, the first guideline is automatically satisfied as to pattern cycles which are not exact divisors of the total numbers of pixels in a line.

Note, however, that where the lines of a frame each have a pattern cycle 3 duty cycle sequence skewed in the foregoing manner, each line is repeated at intervals of 3 (i.e., line 0 = line 3, line 1 = line 4, line 2 = line 5, etc.), and that a group of three consecutive lines with the same pattern cycle 3 duty cycle would repeat itself as the lines progress down the frame.

Because the number of lines on each of the two panels in the illustrative display, 240, is an integral multiple of 3, it is possible that the entire screen pattern could be repeated from timeframe to timeframe. To prevent this, the pixel pattern is skewed or shifted between any two consecutive timeframes. For example, if line 0 begins with 001 in timeframe 1, it beings with 100 in timeframe 2 to avoid a repeating pattern from timeframe to timeframe. This is achieved by setting the pixel (0,0) during timeframe N+1 to be equal to the setting of the pixel (239,639) during the timeframe N. Once this is done, both guidelines are satisfied.

Exemplary sequences of 2/3 duty cycle for obtaining line-to-line and frame-to-frame skewing in accordance with the invention for a display having 240 lines and 640 pixels per line are shown in FIG. 10. The sequences shown are grouped into 8-bit words each expressed as a hexadecimal number. It is noted that along each line the pattern repeats after three consecutive groups, and the spatial pattern of each line repeats after two successive lines. In addition, the pattern of each frame is repeated after two successive frames.

Exemplary sequences of 1/3 duty cycle for achieving line-to-line and frame-to-frame skewing in accordance with the invention is obtained by performing logical inversion on sequences depicted in FIG. 10.

Shades with Pattern Cycle of 5

A pattern cycle of 5 is implemented with two basic sequences, a 4/5 sequence and a 3/5 sequence, as shown in FIG. 6. It will be noted that the 1/5 and 2/5 sequences are logical inversions of the 4/5 and 3/5 sequences, respectively. Thus, only the latter two will be discussed.

The 640 pixels in a given row are divided into 16 sets of five groups of 8 pixels each (G1 through G5) as a matter of convenience (e.g., to make hardware implementation easier). Each Group G1 through G5 is represented in FIG. 6 as a binary bit pattern and its hexadecimal equivalent. When the five groups of either sequence are put together, it will be apparent that they do indeed average out to duty cycles of 4/5 and 3/5, respectively.

Since the groups (G1-G5) are each composed of eight bits, a horizontal line of 640 pixels will contain exactly 80 groups. Every line in a 3/5 or 4/5 sequence therefore may have one of the five possible arrangements along a line, as shown in FIG. 7.

Regardless of which arrangement is used, the resulting pattern in a line will repeat itself line after line, and the resulting pattern in a frame will repeat itself timeframe after timeframe if left alone. This is because the pattern cycle 5 is an exact divisor of both 640 (number of pixels per line) and 240 (number of lines per panel). Skewing prevents repetition of this pattern in a 15 similar manner to that discussed above.

Line-to-line skewing may be achieved as follows. If a line I begins with group N (e.g., G1 is group 1, G2 is group 2, etc.), then the next line I+1 should start with group N+1. If N+1 equals 5, then line I+1 should start with group 1.

Timeframe-to-timeframe skewing may be achieved as follows. If, during a timeframe I, a given spatial pixel sequence ends with group N, then during the next timeframe I+1, that pixel sequence should start with group N.

An example of how these two rules are utilized is shown in FIG. 8. FIG. 9 shows a representation of the upper left and lower right hand corners of an LCD screen for each of the 4/5, 3/5 and 2/3 pixel patterns between two successive timeframes.

Exemplary sequences of 4/5 and 3/5 duty cycles for obtaining line-to-line and timeframe-to-timeframe skewing in accordance with the invention are shown in FIGS. 11 and 12, respectively. Each of the pattern cycle 5 sequences depicted in FIGS. 11 and 12 are grouped into 8-bit patterns denoted by respective hexadecimal numbers. Each of the pattern cycle 5 sequences repeats itself along a line after five successive groups, and the pattern of each line repeats itself after four successive lines. Furthermore, for each of the pattern cycle 5 sequences, the pattern in each frame repeats itself after four successive frames.

Shades with Pattern Cycle of 7

Since the pattern cycle 7 is not an exact divisor of the number of pixels in a line, 640, line-to-line skewing is obtained automatically by permitting a 7 pixel sequence which begins at the end of one line to continue at the beginning of the next line. Furthermore, since the pattern cycle 7 is also not an exact divisor of the number of lines in a frame, 240, frame-to-frame skewing is also automatically obtained by permitting a seven pixel sequence which begins at the end of the last line of one frame to continue at the beginning of the first line of the next frame.

Exemplary sequences of duty cycle of 5/7 and 6/7 in accordance with the invention are shown in FIGS. 13 and 14, respectively. Each of the pattern cycle 7 sequences shown in FIGS. 13 and 14 are grouped into 8-bit patterns denoted by corresponding hexadecimal numbers. The pattern in each line repeats after seven consecutive groups, and the pattern of each line repeats after every six lines. In addition, the pattern of each frame repeats after six successive frames.

Exemplary sequences having duty cycles of 2/7 and 1/7 in accordance with the invention are obtained by performing a logical inversion on the sequences depicted in FIGS. 13 and 14, respectively.

Shades with Pattern Cycle of 9

The pattern cycle 9 is also not an exact divisor into the number of pixels in a line, 640. Therefore, line-to-line skewing is automatically achieved by permitting a 9 pixel pattern which begins at the end of one line to continue at the beginning of the next line. In addition, since the pattern cycle 9 is also not an exact divisor of the number of lines in a frame, 240, frame-to-frame skewing 15 is also automatically obtained by permitting a 9 pixel sequence which begins at the end of the last line of one frame to continue at the beginning of the first line of the next frame.

However, because the pattern cycle 9 has a submultiple of 3, which is integrally divisible into (i.e., an exact divisor of) the number of lines in a frame, allowing the same pixel pattern to continue from frame-to-frame would not produce the correct temporal duty cycle for a given pixel. Accordingly, it is necessary to generate the pattern cycle 9 sequences such that the first eight pixels of the first of the first line of a frame have the same pattern as the last eight pixels of the last line of the previous frame.

Exemplary sequences of duty cycle 8/9 for achieving both line-to-line and frame-to-frame skewing according to the present invention are shown in FIG. 15A and 15B. The 8/9 duty cycle sequences are represented using only two eight pixel groups denoted by hexadecimal numbers 00 and FF. It is noted that the use of the 00 and FF groups do not provide a duty cycle of 8/9 for each nine consecutive pixels along a line (i.e., in the spatial dimension), but does provide a duty cycle of 8/9 for a given pixel over nine consecutive timeframes (i.e., in the temporal dimension). An 8/9 duty cycle in the spatial dimension is obtained only when an average is taken over 72 consecutive pixels. The 8/9 duty cycle sequences shown in FIGS. 15A and 15B were found to produce minimal flicker and "swimming" when used in conjunction with the other duty cycle sequences described herein to produce sixteen shades of gray on an LCD screen.

As shown in FIGS. 15A and 15B, the pixel pattern in each line repeats after eight consecutive groups, and the pixel pattern of each line repeats after eight successive lines. In addition, the pixel pattern of a frame repeats after eight successive frames.

The exemplary sequences having a duty cycle of 1/9 in accordance with the invention are obtained by taking the logical inverse of the sequences of FIGS. 15A and 15B.

Shades with Pattern Cycle of 15

The pattern cycle 15 is not an exact divisor of either the number of pixels in a line, 640, or an integral multiple of the number of lines in a frame, 240. Therefore, line-to-line and frame-to-frame skewing are both automatically obtained by allowing a 15 pixel pattern to continue from the end of one line to the beginning of the next, and from the end of the last line of a frame to the beginning of the first line of the next frame.

However, because the pattern cycle 15 has a submultiple of 3, which is an exact divisor of the number of lines in a frame, 240, allowing the same pixel pattern to continue from frame-to-frame would not produce the correct temporal duty cycle for a given pixel. Accordingly, it is necessary to generate the pattern cycle 15 sequences such that the first eight pixels of the first line of a frame have the same pattern as the last eight pixels of the last line of the previous frame.

It may be noted from FIGS. 16A and 16B that the pixel pattern in a line repeats after fifteen consecutive groups, and the pixel pattern of a line repeats after two successive lines, owing to the pattern cycle 15 being a multiple of 3 which is an exact divisor of the number of lines in a frame, 240. Furthermore, the pixel pattern of a frame obtained using the 7/15 duty cycle sequences repeats after fourteen successive frames.

The exemplary sequences having a duty cycle of 8/15 in accordance with the invention are obtained by performing logical inversion on the 7/15 duty cycle sequences of FIGS. 16A and 16B.

Additional Advantages

The duty cycles described in FIG. 4 obtained by using the duty cycle sequences described in FIGS. 10-16B and the logical inverses of those sequences have been found to be particularly advantageous for producing sixteen shades of gray in a liquid crystal display, especially in minimizing undesired flicker and "swimming". It is noted that even pattern cycles are not used, since even pattern cycles could produce a net dc bias which may damage the LCD panel.

Low-Resolution Cross-Hatching

Conventionally, screen displays are commonly classified as high resolution and low resolution. In high resolution, each pixel is typically composed of one screen dot; in low resolution, each pixel is composed of more than one dot, e.g., a 3×3 dot pattern. The greater number of dots per pixel in low resolution increases the available levels of gray shading.

In accordance with the invention, using a 2×2 dot pattern as a pixel allows cross-hatching in the conventional manner to produce 32 shades of gray instead of 16. For example, cross-hatching can be used in low resolution to produce a pixel that is darker than a 0 pixel but lighter than a 1/9 pixel. Similarly, such cross-hatching can be used to produce a gray shade between a 1/9 and a 1/7 pixel.

FIG. 17 sets forth a table of duty cycles that may be used in generating 32 shades of gray. Also shown in FIG. 17 is a quartered box representing a 4-dot pixel, each quarter representing a screen dot. Diagonally adjacent pairs of screen dots of the box are indicated as being even or odd to correspond to a respective column of duty cycles in the table.

Display Control System

A function block diagram of an exemplary display control system capable of implementing the invention is shown in FIG. 18. A conventional Video Controller 5 outputs an 8-bit color index that specifies which color (out of a possible 256) is desired for display. The 8-bit color index is mapped to a 5-bit gray-scale index by the contents of the gray-scale pallet RAM 4. The gray-scale index is then provided to a Low-Resolution Generator 3. The Low-Resolution Generator 3 in turn provides a 4-bit selection signal to two 16:1 Multiplexers 6 and 7. The Multiplexer 6 selects one of the dc voltage levels corresponding to the ON or OFF state of a pixel, or a bit of one of the digital signals CO8/9-CO1/9 provided by the Data Generator 8 for the current screen dot of the LCD display being addressed by the Video Controller 5. The output of the Multiplexer 6 is provided to an LCD Data Buffer 9, which in turn provides 8-bit display characters to the LCD panel.

In the exemplary embodiment, the LCD panels are refreshed at a rate of approximately 140 Hz, while the frame rate of the Video Controller 5, which drives the Data Generator 8, is at approximately 70 Hz. Therefore, the Data Generator 8 generates not only the duty cycle digital signals CO8/9-CO1/9 for the current frame, but also the duty cycle digital signals NFCO8/9-NFCO1/9 for the next frame. The Multiplexer 7 in response to the selection signal from the Low Resolution Generator 3 selects one of the ON or OFF voltage levels, or a bit of one of the next frame digital signals NFCO8/9-NFCO1/9 provided by the Data Generator 8 for the current screen dot of the LCD display being addressed by the Video Controller 5. The output of the Multiplexer 7 is provided to a Next Frame RAM buffer 10, which in turn provides its output to the LCD Data Buffer 9. In response to the end-of-frame signal from the Display Controller 5, the LCD Data Buffer 9 alternately provides the output of the Next Frame Buffer 10 and the output of the Multiplexer 6 to the upper and lower LCD panels, respectively.

Data Generator

Figure 19:
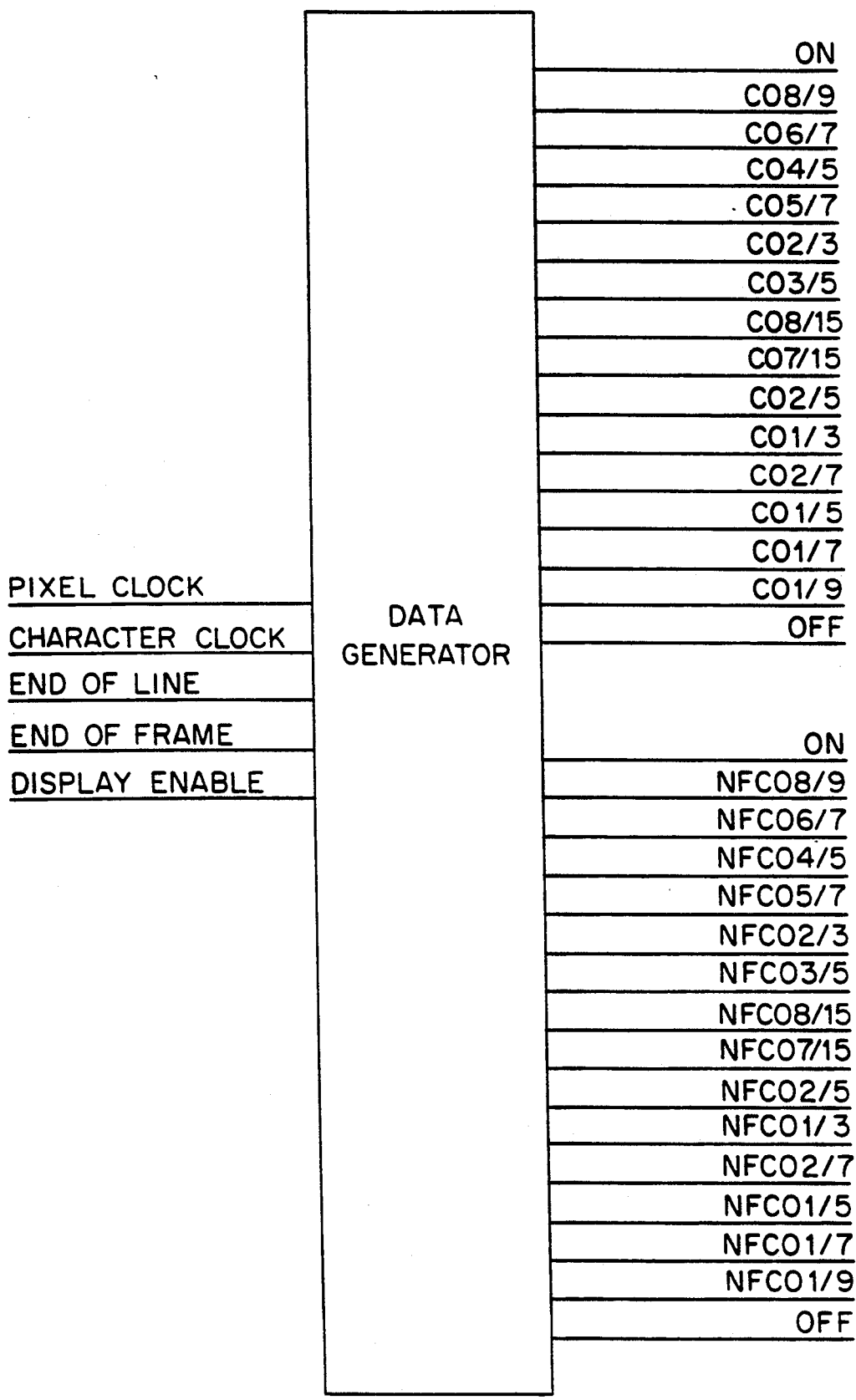
FIG. 19 is a functional block diagram of the data generator of the display control system of FIG. 18 showing the input signals and the output digital signals for the present frame and the next frame.

A block diagram of the Data Generator 8 of the display control system of FIG. 18 is shown in FIG. 19. The Data Generator 8 receives from the Video Controller 5 a pixel clock, a character clock, and end-of-line signal (horizontal sync. signal), and end-of-frame signal (vertical sync. signal) and a display enable signal. The latter signal indicates when the Video Controller, which is capable of scanning 720 pixels in a line, has completed scanning of 640 pixels.

The Data Generator 8 contains circuits for concurrently providing dc levels corresponding to the ON and OFF states of the pixels, and the serial digital signals CO8/9-CO1/9 for the current frame and NFCO8/9-NFCO1/9 for the next frame in synchronism with the pixel clock. The digital signals provided by the Data Generator 8 correspond to the duty cycle sequences illustrated in FIGS. 10-16 and the logical inversions of those sequences.

Figure 20:
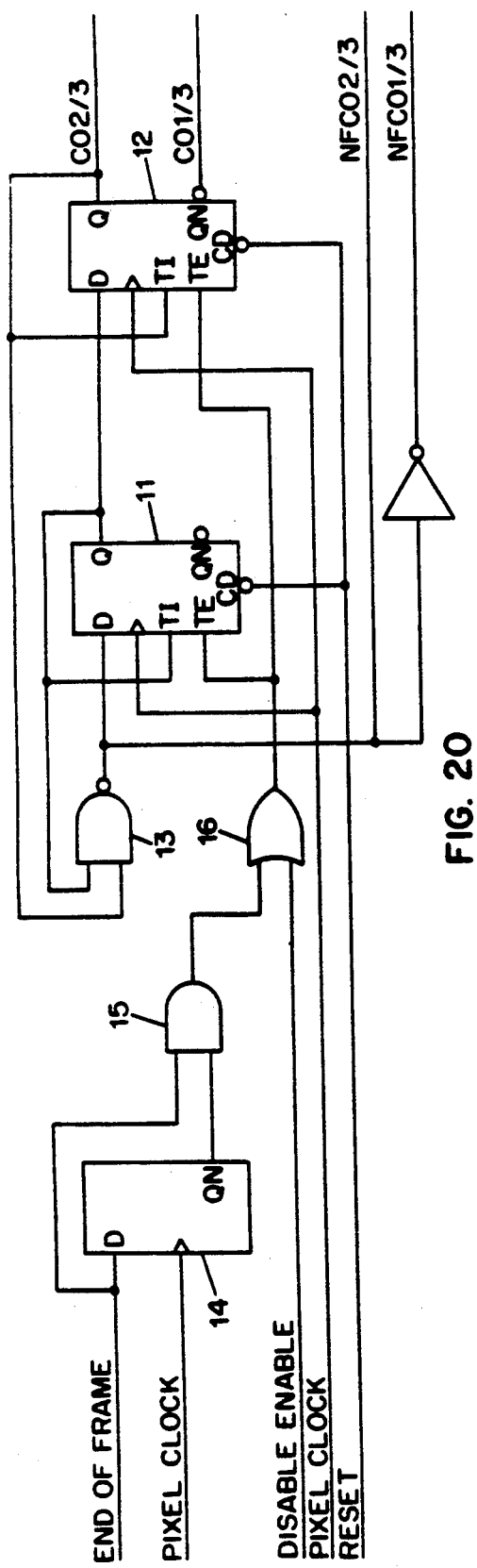
FIG. 20 is a schematic diagram of a circuit of the data generator of FIG. 19 for concurrently generating respective digital signals having a pattern cycle of 3 and duty cycles of 1/3 and 2/3 for the current frame and for the next frame, the digital signals having respective bit patterns in accordance with the sequences shown in FIG. 10.

Referring to FIG. 20, there is shown the circuit of the Data Generator 8 for generating the pattern cycle 3 serial digital signals CO1/3 and CO2/3, and the next frame digital signals NFCO1/3 and NFCO2/3. The circuit of FIG. 20 consists of a feedback shift register, formed by flip-flops 11 and 12 and NAND Gate 13, serving as a modulo 3 ring counter to provide the digital signals CO2/3 and CO1/3. The next frame digital signals NFCO2/3 and NFCO1/3 are taken from the output of the NAND Gate 13. The circuit consisting of flip-flop 14, AND Gate 15 and OR Gate 16 causes the ring counter to hold for one pixel clock upon receiving an end-of-frame signal, and receiving the display enable signal, to hold the ring counter for pixel counts greater than 640 in a line.

Figure 21:
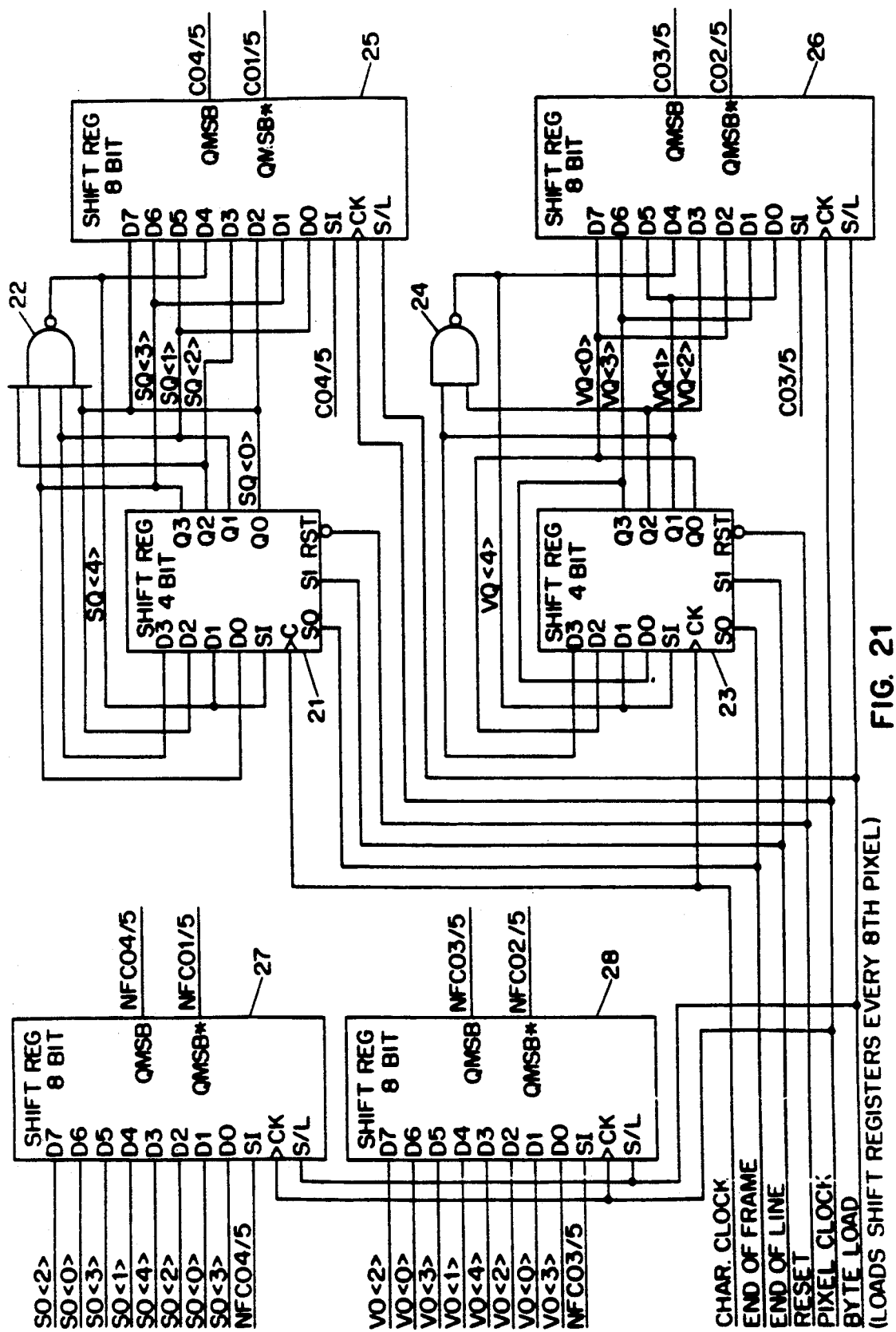
FIG. 21 is a schematic diagram of a circuit in the data generator of FIG. 19 for concurrently generating respective digital signals having a pattern cycle of 5 and duty cycles of 1/5, 2/5, 3/5 and 4/5 for the current frame and for the next frame, the digital signals having respective bit patterns in accordance with the sequences shown in FIGS. 11 and 12.

Turning now to FIG. 21, there is shown the circuit of the Data Generator 8 for generating the pattern cycle 5 serial digital signals CO1/5, CO2/5, CO3/5 and CO4/5, and the next frame digital signals NFCO1/5, NFCO2/5, NFCO3/5 and NFCO4/5. The circuit of FIG. 21 consists of two modulo 5 ring counters formed by shift register 21 and NAND Gate 22, and shift register 23 and NAND Gate 24, respectively. The outputs of the ring counters are provided to serializing shift registers 25 and 26 which in turn provides the digital signals CO4/5 and CO1/5, and CO3/5 and CO2/5, respectively. The next frame digital signals NFCO4/5 and NFCO1/5, and NFCO3/5 and NFCO 2/5 are provided by serializing shift registers 27 and 28, respectively, each of which providing the necessary offsets. The modulo 5 ring counters are responsive to an end-of-line signal to cause the line-to-line skewing illustrated in FIGS. 11 and 12, and are responsive to an end-of-frame signal to provide the frame-to-frame skewing illustrated in the same figures.

Figure 22:
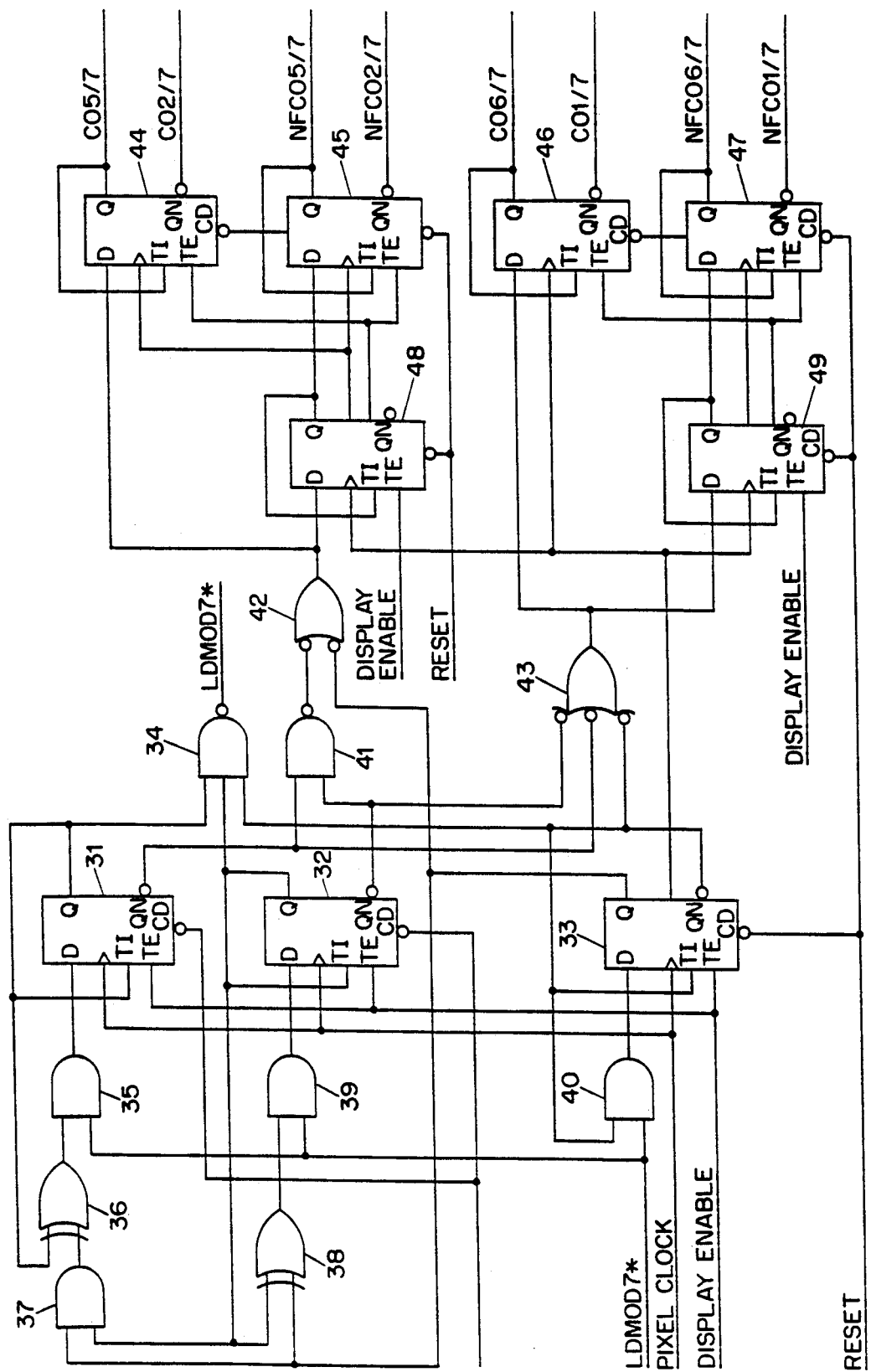
FIG. 22 is a schematic diagram of a circuit in the data generator of FIG. 19 for concurrently generating respective digital signals having a pattern cycle of 7 and duty cycles of 1/7, 2/7, 5/7 and 6/7 for the current frame and for the next frame, the digital signals having respective bit patterns in accordance with the sequences shown in FIGS. 13 and 14.

Referring to FIG. 22, there is shown the circuit of the Data Generator 8 for providing the pattern cycle 7 serial digital signals CO1/7, CO2/7, CO5/7 and CO6/7 for the current frame, and NFCO1/7, NFCO2/7, NFCO5/7 and NFCO6/7 for the next frame. The circuit of FIG. 22 consists of a modulo 7 binary counter formed by flip-flops 31-33 and gates 34-40. The outputs of the binary counter are decoded by gates 41-43 and serialized by flip-flops 45-47. The flip-flops 48 and 49 provide the necessary delays for deriving the next frame signals NFCO5/7, NFCO2/7, NFCO6/7 and NFCO1/7. The binary counter and the delay flip-flops 48 and 49 are held upon receiving the display enable signal upon the completion of scanning of 640 pixels in a line.

Figure 23:
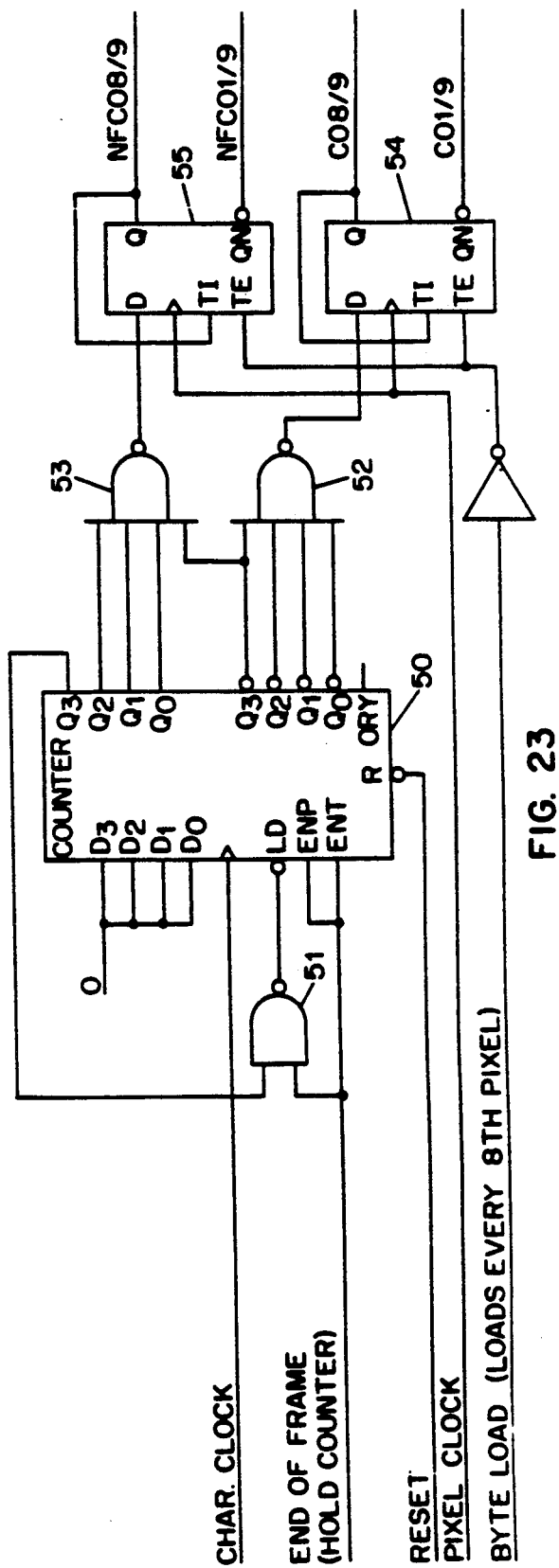
FIG. 23 is a schematic diagram of a circuit of the data generator of FIG. 19 for concurrently generating respective digital signals having a pattern cycle of 9 and duty cycles of 1/9 and 8/9 for the current frame and for the next frame, the digital signals having respective bit patterns in accordance with the sequences shown in FIGS. 15A and 15B.

Turning to FIG. 23, there is shown the circuit of the Data Generator 8 for generating the pattern cycle 9 serial digital signals CO1/9 and CO8/9 for the current frame, and NFCO1/9 and NFCO8/9 for the next frame. The circuit of FIG. 23 consists of a modulo 9 binary counter formed by counter 50 and NAND gate 51. The outputs of the binary counter are decoded by gates 52 and 53 and serialized by flipflops 54 and 55. The decoding gate 53 provides the necessary offsets for deriving the next frame digital signals NFCO8/9 and NFCO1/9. The binary counter is responsive to the end-of-frame signal for holding its contents to insure correct temporal duty cycles for the pattern cycle 9 sequences.

Figure 24A:
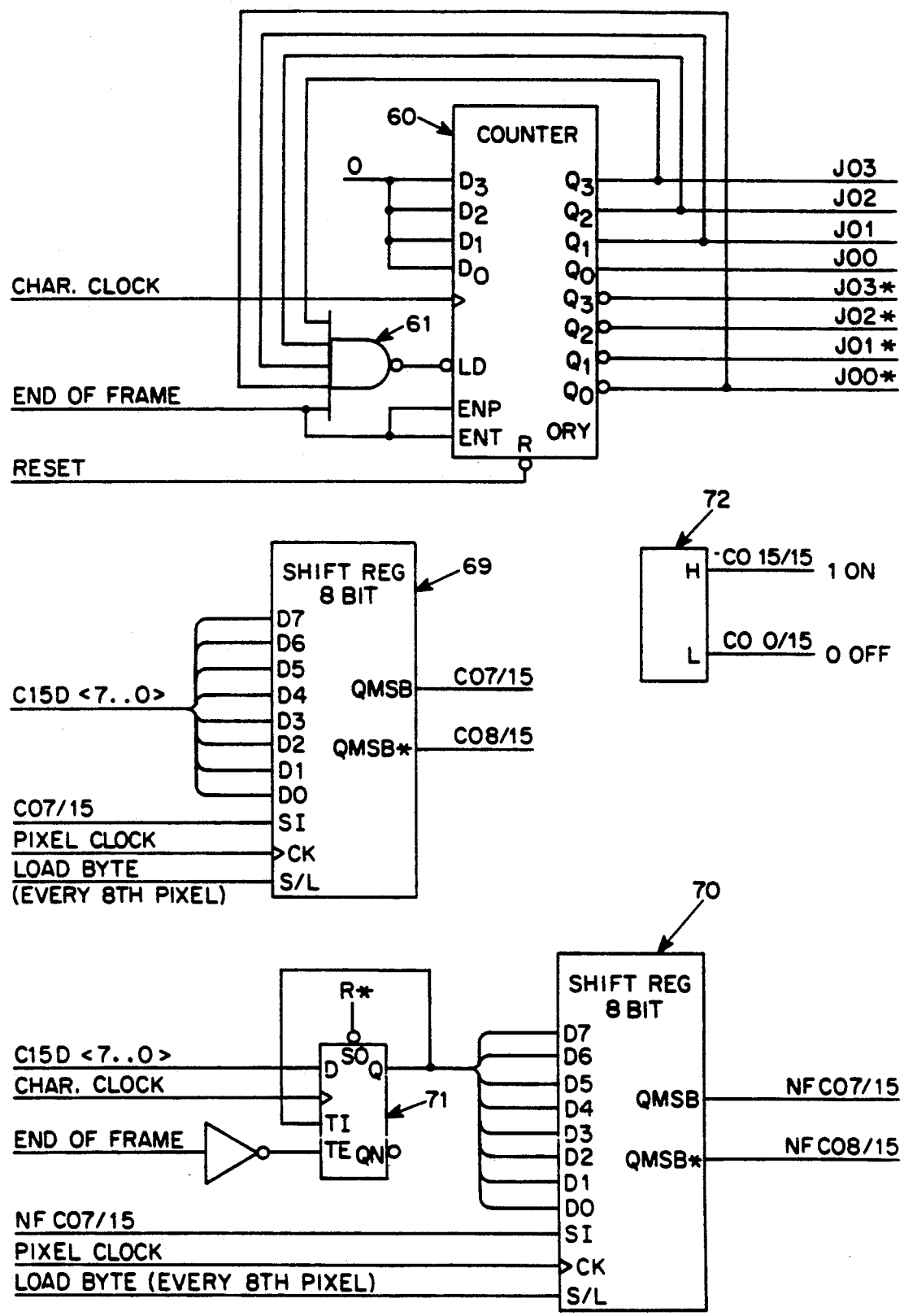
FIGS. 24A and 24B are schematic diagrams of circuits in the data generator of FIG. 19 for generating dc voltage levels corresponding to the ON and OFF states of the LCD screen dots, and the circuit for concurrently generating respective digital signals having a pattern cycle of 15 and duty cycles of 7/15 and 8/15 for the current frame and for the next frame, the digital signals having respective bit patterns in accordance with the sequences shown in FIGS. 16A and 16B.
Figure 24B:
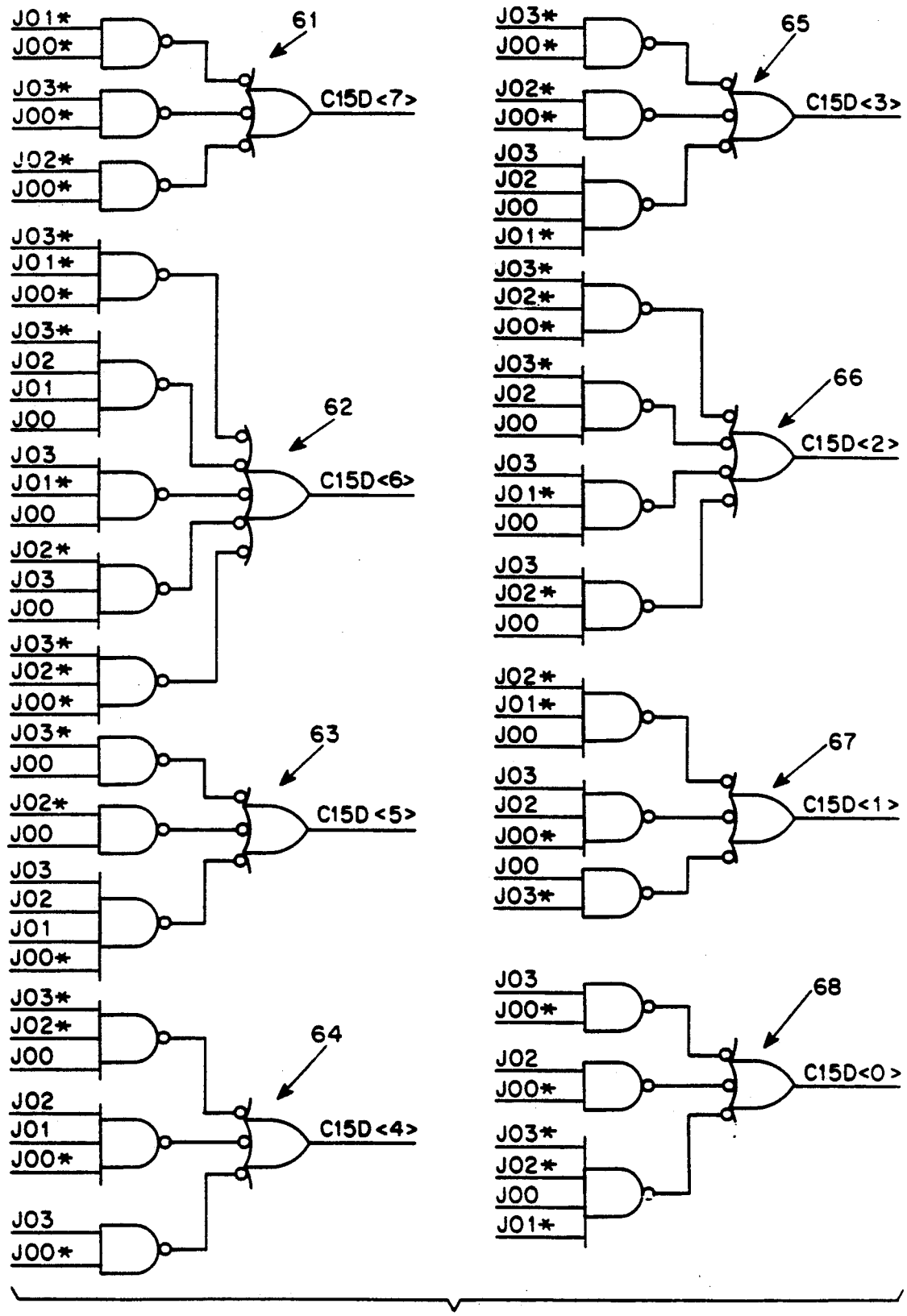

Referring now to FIGS. 24A and 24B, there is shown the circuit of the Data Generator 8 for generating the pattern cycle 15 serial digital signals CO7/15 and CO8/15 for the current frame, and NFCO7/15 and NFCO8/15 for the next frame. The circuit of FIGS. 24A and 24B consists of a modulo 15 binary counter formed by counter 60 and NAND gate 61. The outputs of the binary counter are decoded by decoding circuits 61-68, and the decoded digital signals are loaded into and serialized by shift registers 69 and 70. The flip-flop 71 provides the necessary delay for deriving the next frame digital signals NFCO7/15 and NFCO8/15. The binary counter is responsive to the end-of-frame signal for holding its contents to insure correct temporal duty cycles for the pattern 15 sequences.

Also shown in FIGS. 24A and 24 B is a block diagram 72 of the circuit for generating the dc levels for driving the pixels of the LCD panels to the ON and to the OFF states, respectively.

Figure 25:
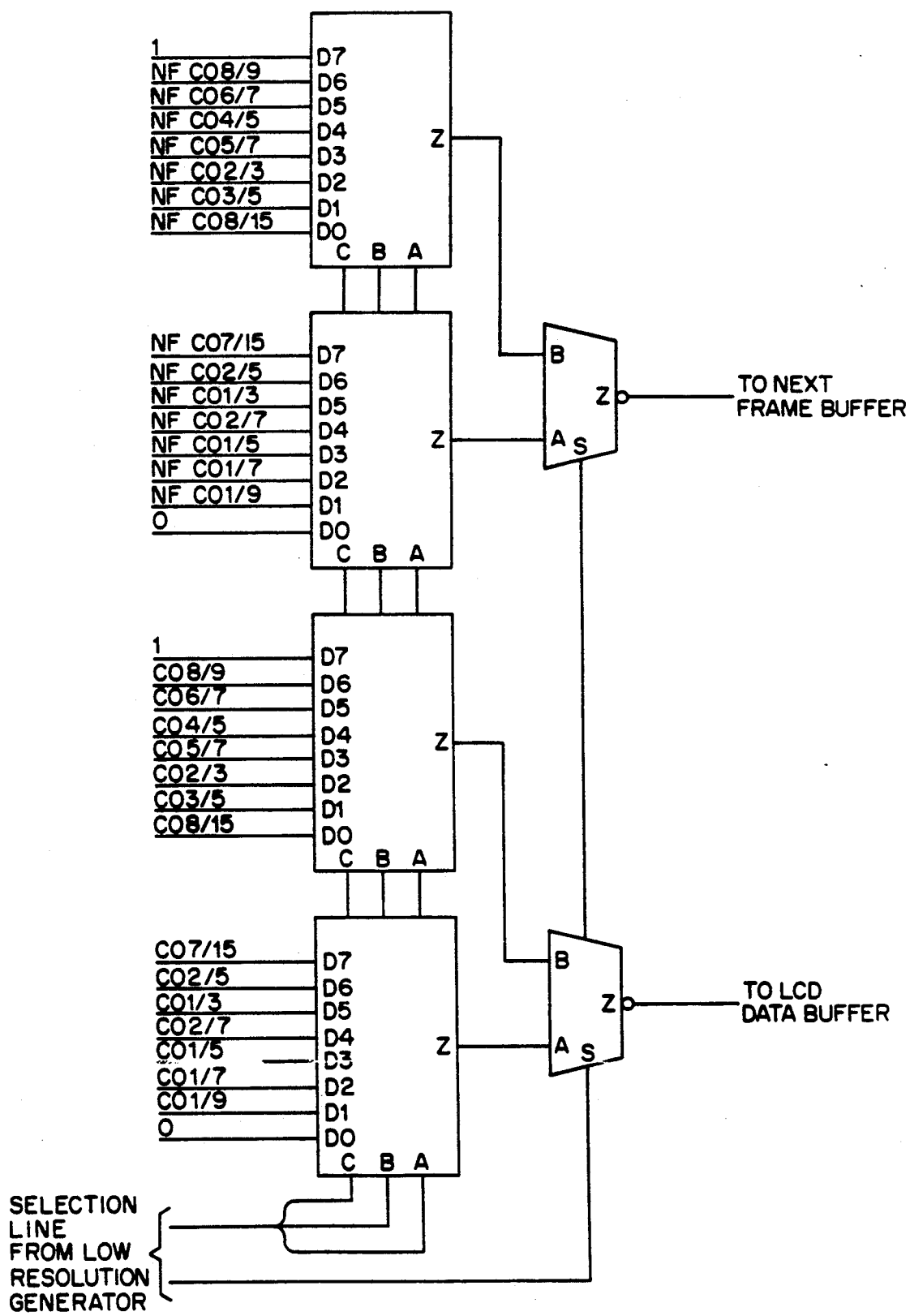
FIG. 25 is a schematic diagram illustrating the construction of the two 16:1 multiplexers of the display control system of FIG. 18.

Turning to FIG. 25, there is shown the construction of Multiplexer 6 and Multiplexer 7. Each of Multiplexers 6 and 7 consists of the combination of two 8:1 multiplexers and one 2:1 multiplexer.

When the dc and digital signals for all 16 shades are available for the current frame and for the next frame, such signals are passed on to the 16:1 Multiplexers 6 and 7, as shown in FIGS. 18 and 25. The four control lines for the Multiplexers 6 and 7 then choose one of the 16 shades of gray for the Current frame and the next frame, and send it to the LCD Data Buffer 9 and the Next Frame Buffer 10, respectively.

In low resolution mode, this selection provides a maximum of 32 different shades. The 8-bit color index from the Video Controller 5 will be used to determine which of the 32 cross-hatched shades is desired.

Cross-hatching is actually performed within the Low Resolution Generator 3. However, if high resolution is desired, then the 5-bit gray scale index from the gray-scale pallet RAM 4 must pass through the Low Resolution Generator and be further reduced to 4 bits (16 choices). Once this is done, these bits pass on to the Multiplexers 6 and 7, and one of the sixteen high resolution shades is chosen for the current frame and for the next frame, and sent to the LCD panel to be displayed in the current frame and in the next frame.

It will be apparent to those skilled in the art that if the display controller 5 provides a frame rate which is the same as the refresh rate of the LCD panel, i.e., approximately 140 Hz, the Multiplexer 7 and the next frame buffer 10 of the display control system of FIG. 18 may be eliminated, along with all of the circuitry in FIGS. 20-25 for generating and multiplexing the next frame digital signals.

It will be recognized by those of ordinary skill in the art having the benefit of this disclosure that the embodiments described here are presented for the purpose of illustrating, and not of limiting, the invention defined by the claims set forth below.

I claim:

1. A display control system for producing an optical gray-scale image on a display device having an array of display elements each providing a first or a second optical state in response to a first or a second signal level, respectively, the array of display elements having a plurality of rows and a plurality of columns, the system comprising:

means for generating respective display signals for the display elements for producing a gray-scale image of a specified color, the display signals comprising digital signals each having a pattern of bits respectively corresponding to the first or the second signal level, a predefined pattern cycle and a duty cycle or average duty cycle related to the optical gray-scale of the image at the position of the respective display element, the duty cycle being determined over one or more of the predefined pattern cycle, the pattern of bits of each one of the digital signals being repetitively generated, the means for generating display signals providing successive bits of the display signals for respective display elements in successive timeframes, in each timeframe one bit of each of the display signals being provided in sequence for consecutive display elements in each row from a first to a last display element of the row and for consecutive rows beginning at a first row and ending at a last row of the array, and causing a predetermined skewing of each subsequently generated display signal having a pattern cycle which is an exact divisor of the total number of display elements in a row each time a bit of a respective display signal is provided for the last display element of a row, and causing a predetermined skewing of each subsequently generated display signal having a pattern cycle or a submultiple thereof which is an exact divisor of the total number of display elements in the array each time a bit of a respective display signal is provided for the last display element of the last row of the array.

2. The display control system of claim 1, wherein the display device is a liquid crystal display (LCD) panel and the array of display elements comprises an array of screen dots of the LCD panel.

3. The display control system of claim 1, wherein the means for generating the display signals for the display elements includes:

means for concurrently generating a plurality of serial digital signals each having a pattern of bits respectively corresponding to the first or the second signal levels, a predefined pattern cycle and a different duty cycle, the duty cycle being determined over one or more of the predefined pattern cycle;

means for generating the first and the second signal levels;

display control means for providing address data for sequentially addressing consecutive display elements in consecutive rows of the array in each timeframe from the first display element of the first row to the last display element of the last row, color attribute data associated with each display element being addressed, an end-of-row signal when address data for addressing the last display element of a row is provided, and an end-of-frame signal when address data for addressing the last display element of the last row is provided; and display signal selection means responsive to the address data and the color attribute data for selecting the first or the second signal level, or a respective bit of one of the plurality of serial digital signals having a duty cycle related to the optical gray-scale of the image at the position of the display element being addressed, and wherein the means for generating the plurality of serial digital signals is responsive to the end-of-row signal for skewing by a predetermined number of bit positions each subsequently generated digital signal having a pattern cycle which is an exact divisor of the number of display elements of a row, and is further responsive to the end-of-frame signal for skewing by a predetermined number of bit positions each subsequently generated digital signal having a pattern cycle which is an exact divisor of the total number of display elements of the array or having a pattern cycle a submultiple of which is an exact divisor of the total number of display elements of the array.

4. The display control system of claim 3, wherein the means for generating a plurality of serial digital signals includes respective counter means for generating each pair of serial digital signals having the same pattern cycle and complementary patterns of bits, each counter means including a modulo N counter, where N is equal to the pattern cycle of the digital signals generated thereby.

5. The display control system of claim 1, wherein the optical gray-scale image produced on the display device is composed of an array of pixels each consisting of a respective one of the display elements, the image having sixteen gray-scale levels and each one of the display signals having a pattern cycle of 3, 5, 7, 9 or 15 and a duty cycle of 1/3 or 2/3, or 1/5, 2/5, 3/5 or 4/5, or 1/7, 2/7, 5/7 or 6/7, or 1/9 or 8/9, or 7/15 or 8/15, respectively, or a duty cycle of 0 or 1, where the duty cycle of 0 corresponds to the first optical state and the duty cycle of 1 corresponds to the second optical state.

6. The display control system of claim 5, wherein the array of pixels has 240 rows and 640 pixels in each row, the display signal having a pattern cycle of 9 and a duty cycle of 8/9 comprising a repetitive sequence of a first group of the form 00000000 followed by eight repetitions of a second group of the form 11111111, each subsequently generated display signal having a pattern cycle of 9 and a duty cycle of 8/9 being skewed by beginning with an additional repetition of the last of the first or the second group in the last eight display elements of the last row of the array, and wherein the display signal having a pattern cycle of 9 and a duty cycle of 1/9 has a sequence which is the logical inverse of the sequence of the display signal having a pattern cycle of 9 and a duty cycle of 8/9.

7. The display control system of claim 1, wherein the optical gray-scale image produced on the display device is composed of an array of pixels each consisting of a separate group of display elements in consecutive rows and consecutive columns, and a respective optical gray-scale level is obtained for each one of the pixels by cross-hatching of the display elements of the pixel by providing respective display signals therefore.

8. The display control system of claim 7, wherein each pixel of the optical gray-scale image produced on the display device consists of a respective group of four mutually adjacent display elements, including two pairs of diagonally adjacent display elements, the image having thirty-two gray-scale levels, each one of the display signals having a pattern cycle of 3, 5, 7, 9 or 15 and a duty cycle of 1/3 or 2/3, or 1/5, 2/5, 3/5 or 4/5, or 1/7, 2/7, 5/7 or 6/7, Or 1/9 or 8/9, or 7/15 or 8/15, respectively, or a duty cycle of 0 or 1, the display control system generating a respective pair of display signals having the same duty cycle for each diagonally adjacent pair of display elements of a pixel, and the duty cycles of the respective pairs of display signals for the two diagonally adjacent pairs of display elements of each pixel being 0-0, 1/9-0, 1/9-1/9, 1/9-1/5, 1/7-1/9, 1/7-1/7, 1/5-1/7, 1/5-1/5, 2/7-1/5, 2/7-2/7, 1/3-2/7, 1/3-1/3, 2/5-1/3, 2/5-2/5, 7/15-2/5, 7/15-7/15, 8/15-7/15, 8/15-8/15, 3/5-8/15, 3/5-3/5, 2/3-3/5, 2/3-2/3, 5/7-2/3, 5/7-5/7, 4/5-5/7, 4/5-4/5, 6/7-4/5, 6/7-6/7, 8/9-6/7, 8/9-8/9. 1-8/9 or 1-1, where the duty cycle of 0 corresponds to the first optical state and the duty cycle of 1 corresponds to the second optical state.

9. A method for driving a display device having a multiplicity of display elements each providing a first or a second optical state in response to a first or a second signal level, respectively, to produce an optical gray-scale image, the display elements being disposed in an array having a plurality of rows and a plurality of columns, the method comprising the steps of:

generating respective display signals for the display elements for producing a gray-scale image of a specified color, the display signals comprising digital signals each having a pattern of bits respectively corresponding to the first or the second signal level and having a predefined pattern cycle and a duty cycle related to the optical gray-scale of the image at the position of the respective display element, the duty cycle being determined over one or more of the predefined pattern cycle the pattern of bits of each one of the digital signals being repetitively generated:

providing successive bits of the display signals for the display elements in successive timeframes, in each timeframe one bit of each of the display signals being provided in sequence for consecutive display elements in each row from a first to a last display element of the row, and for consecutive rows beginning at a first row and ending at a last row of the array;

causing a predetermined skewing of each subsequently generated display signal having a pattern cycle which is an exact divisor of the total number of display elements in a row each time a bit of a respective display signal is provided for the last display element of a row; and causing a predetermined skewing of each subsequently generated display signal having a pattern cycle or a submultiple thereof which is an exact divisor of the total number of display elements in the array each time a bit of a respective display signal is provided for the last display element of the last row of the array, whereby in successive timeframes adjacent display elements in each row of the array are provided with different sequences of the first and the second signal levels, and adjacent display elements in each column of the array are provided with different sequences of the first and the second signal levels.

10. The method for driving a display device of claim 9, wherein the display device is a liquid crystal display (LCD) panel and the multiplicity of display elements is a multiplicity of screen dots of the LCD panel.

11. The method for driving a display device according to claim 9, wherein the step of generating respective display signals includes the steps of generating the first and the second signal levels, and concurrently generating a plurality of serial digital signals each having a pattern of bits respectively corresponding to the first or the second signal levels, a predefined pattern cycle, and a different duty cycle, the duty cycle being determined over one or more of the predefined pattern cycle; and the step of providing successive bits of the display signals for the display elements in successive timeframes includes the steps of: generating address data for sequentially addressing consecutive display elements in consecutive rows of the array in each timeframe from the first display element of the first row to the last display element of the last row, generating color attribute data associated with each display element being addressed, generating an end-of-row signal when address data for addressing the last display element of a row is generated, generating an end-of-frame signal when address data for addressing the last display element of the last row is generated, and selecting the first or the second signal level, or a respective bit of one of the plurality of serial digital signals having a duty cycle representative of the optical gray-scale of the image at the position of the display element being addressed; and wherein each subsequently generated digital signal having a pattern cycle which is an exact divisor of the number of display elements of a row is skewed by a predetermined number of bit positions each time the end-of-row signal is generated, and each subsequently generated digital signal having a pattern cycle or a submultiple thereof which is an exact divisor of the total number of display elements of the array is skewed by a predetermined number of bit positions each time the end-of-frame signal is generated.

12. The method for driving a display device according to claim 9, wherein the optical gray-scale image produced on the display device is composed of an array of pixels each consisting of a respective one of the display elements, the image having sixteen gray-scale levels and each one of the display signals having a pattern cycle of 3, 5, 7, 9 or 15 and a duty cycle of 1/3 or 2/3, or 1/5, 2/5 or 4/5, or 1/7, 2/7, 5/7 or 6/7, or 1/9 or 8/9, or 7/15 or 8/15, respectively, or a duty cycle of 0 or 1, where the duty cycle of 0 corresponds to the first optical state and the duty cycle of 1 corresponds to the second optical state.

13. The method for driving a display device according to claim 12, wherein the display device is composed of an array of pixels having 240 rows and 640 pixels in each row, the display signal having a pattern cycle of 9 and a duty cycle of 8/9 comprising a repetitive sequence of a first group of the form 00000000 followed by eight repetitions of a second group of the form 11111111, each subsequently generated display signal having a pattern cycle of 9 and a duty cycle of 8/9 being skewed by beginning with an additional repetition of the last of the first or the second group in the last eight display elements of the last row of the array, and wherein the display signal having a pattern cycle of 9 and a duty cycle of 1/9 has a sequence which is the logical inverse of the sequence of the display signal having a pattern cycle of 9 and a duty cycle of 8/9.

14. The method for driving a display device according to claim 9, wherein the optical gray-scale image produced on the display device is composed of an array of pixels each consisting of a separate group of display elements in consecutive rows and consecutive columns, and a respective gray-scale level is obtained for each one of the pixels by cross-hatching of the display elements of the pixel by providing respective display signals therefor.

15. The method for driving a display device according to claim 14, wherein each pixel of the optical gray-scale image produced on the display device consists of a respective group of four mutually adjacent display elements, including two pairs of diagonally adjacent display elements, the image having sixteen gray-scale levels, each one of the display signals having a pattern cycle of 3, 5, 7, 9 or 15, and a duty cycle of 1/3 or 2/3, or 1/5, 2/5, 3/5 or 4/5, or 1/7, 2/7, 5/7 or 6/7, or 1/9 or 8/9, or 17/15 or 8/15,respectively, or a duty cycle of 0 or 1, the display control system generating a respective pair of display signals having the same duty cycle for each diagonally adjacent pair of display elements of a pixel, and the duty cycles of the respective pairs of display signals for the two diagonally adjacent pairs of display elements of each pixel being 0-0, 1/9-0, 1/9-1/9, 1/9-1/5, 1/7-1/9, 1/7-1/7, 1/5-1/7, 1/5-1/5, 2/7-1/5, 2/7-2/7, 1/3-2/7, 1/3-1/3, 2/5-1/3, 2/5-2/5, 7/15-2/5, 7/15-7/15, 8/15-7/15, 8/15-8/15, 3/5-8/15, 3/5-3/5, 2/3-3/5, 2/3-2/3, 5/7-2/3, 5/7-5/7, 4/5-5/7, 4/5-4/5, 6/7-4/15, 6/7-6/7, 8/9-6/7, 8/9-8/9, 1-8/9 or 1-1, Where the duty cycle of 0 corresponds to the first optical state and the duty cycle of 1 corresponds to the second optical state.

* * * * *